United States Patent [19]
Inoue et al.

[11] Patent Number: 5,642,899
[45] Date of Patent: Jul. 1, 1997

[54] DAMPING FORCE CONTROL SYSTEM FOR AUTOMOTIVE VEHICLE

[75] Inventors: Hideo Inoue, Asigarakami-gun; Hajime Kamimae, Okazaki; Mitsuhiko Morita, Susono; Hiroyoshi Kojima, Nishio, all of Japan

[73] Assignee: Toyota Jidosha Kabushiki Kaisha, Toyota, Japan

[21] Appl. No.: 512,324

[22] Filed: Aug. 8, 1995

[30] Foreign Application Priority Data

Aug. 8, 1994 [JP] Japan .................................. 6-186097
Jun. 9, 1995 [JP] Japan .................................. 7-143601

[51] Int. Cl.⁶ .................................................. B60G 17/00
[52] U.S. Cl. .................... 280/707; 188/299; 364/424.046
[58] Field of Search .................................. 188/299, 378, 188/379, 380; 280/707; 364/424.05; 267/136

[56] References Cited

U.S. PATENT DOCUMENTS

| | | | |
|---|---|---|---|
| 5,105,358 | 4/1992 | Takase et al. | 280/707 |
| 5,235,529 | 8/1993 | Hanson et al. | 280/707 |
| 5,289,380 | 2/1994 | Kimura | 280/707 |
| 5,324,068 | 6/1994 | Kallenbach et al. | 280/707 |
| 5,342,079 | 8/1994 | Buma | 280/707 |
| 5,382,045 | 1/1995 | Takeda et al. | 280/707 |
| 5,425,436 | 6/1995 | Teramura et al. | 188/299 |
| 5,429,384 | 7/1995 | Takahashi et al. | 280/707 |
| 5,452,209 | 9/1995 | Dinkelacker et al. | 280/707 |
| 5,467,280 | 11/1995 | Kimura | 280/707 |
| 5,483,450 | 1/1996 | Titli et al. | 280/707 |
| 5,485,377 | 1/1996 | Sasaki et al. | 280/707 |
| 5,488,556 | 1/1996 | Sasaki | 280/707 |
| 5,489,115 | 2/1996 | Osaki et al. | 280/707 |
| 5,490,068 | 2/1996 | Shimizu et al. | 280/707 |
| 5,497,324 | 3/1996 | Henry et al. | 280/707 |
| 5,510,985 | 4/1996 | Yamaoka et al. | 280/707 |
| 5,510,988 | 4/1996 | Majeed et al. | 280/707 |

FOREIGN PATENT DOCUMENTS

| | | |
|---|---|---|
| 276806 | 12/1991 | Japan . |
| 276807 | 12/1991 | Japan . |
| 276808 | 12/1991 | Japan . |
| 276811 | 12/1991 | Japan . |
| 246227 | 9/1993 | Japan . |

*Primary Examiner*—Douglas C. Butler
*Attorney, Agent, or Firm*—Kenyon & Kenyon

[57] ABSTRACT

A damping force control system for an automotive vehicle having a semiactive damper mechanism provided between an unsprung mass and a sprung mass of the vehicle, wherein vertical velocity of the sprung mass is detected so that switchover of the semiactive damper mechanism from a low damping state to a high damping state is permitted upon lapse of a predetermined time after it has been detected that an absolute value of the detected vertical velocity of the sprung mass exceeded a preselected magnitude of approximate zero.

8 Claims, 19 Drawing Sheets

DAMPING FORCE CONTROL SYSTEM FOR AUTOMOTIVE VEHICLE

BACKGROUND OF THE INVENTION

1. Field of the Invention

The present invention relates to a damping force control system for an automotive vehicle for controlling a semiactive damper mechanism provided between an unsprung mass and a sprung mass of the vehicle to dampen vertical vibration of the sprung mass. More particularly, the present invention relates to a damping force control system capable of switching over the semiactive damper mechanism from a low damping state to a high camping state in response to an increase of vertical vibration of the sprung mass.

2. Description of the Prior Art

Disclosed in Japanese Patent Laid-open Publication No. 3(1991)-276806 is a control system for a semiactive damper mechanism wherein vertical velocity of a sprung mass of an automotive vehicle and relative velocity between an unsprung mass of the vehicle and the sprung mass are detected to control a damping force of the damper mechanism against the vertical vibration of the sprung mass. In such a conventional control system, the damper mechanism is switched over to control the damping force when the relative velocity between the sprung mass and the unsprung mass is approximately zero thereby to decrease an impact applied thereto when it has been switched over in a condition where the relative velocity between the sprung mass and the unsprung mass is other than zero. This is effective to reduce undesirable shocks and noises caused by switchover of the damping force. In the conventional control system, it is, however, required to provide a sensor for detecting relative velocity between the sprung mass and the unsprung mass. Since the sensor is, in general, mounted on the vehicle body at a position located near the surface of a travel road and exposed to the outside air, there will occur a problem in durability of the sensor.

SUMMARY OF THE INVENTION

It is, therefore, a primary object of the present invention to provide a damping force control system capable of reducing undesirable shocks and noises caused by switchover of the damping force in a simple construction without the provision of the sensor for detection of relative velocity between the sprung mass and the unsprung mass.

According to the present invention, the object is accomplished by providing a damping force control system for an automotive vehicle having a semiactive damper mechanism provided between an unsprung mass and a sprung mass of the vehicle to dampen vertical vibration of the sprung mass, the control system including control means for switching over the semiactive damper mechanism from a low damping state to a high damping state in response to an increase of vertical vibration of the sprung mass, which control system comprises first detection means for detecting vertical velocity of the sprung mass; second detection means for detecting the fact that an absolute value of the detected vertical velocity has exceeded a preselected magnitude of approximate zero; and means for permitting switchover of the damper mechanism from the low damping state to the high damping state upon lapse of a predetermined time after it has been detected by the second detection means that the absolute value of the detected vertical velocity exceeded the preselected magnitude.

According to an aspect of the present invention, there is provide a damping force control system for an automotive vehicle having a semiactive damper mechanism provided between an unsprung mass and a sprung mass of the vehicle to dampen vertical vibration of the sprung mass, which control system comprises first detection means for detecting vertical velocity of the sprung mass of the vehicle; second detection means for detecting the fact that an absolute value of the detected vertical velocity has exceeded a preselected magnitude of approximate zero; third detection means for detecting the fact that the absolute value of the detected vertical velocity has decreased approximately zero after it was detected by the second detection means; first control means for switching over the semiactive damper mechanism from a low damping state to a high damping state upon lapse of a predetermined time after it has been detected by the second detection means that the detected vertical velocity exceeded the preselected magnitude; and second control means for switching over the semiactive damper mechanism from the high damping state to the low damping state at the time when it has been detected by the third detection means that the absolute value of the detected vertical velocity decreased approximately zero.

According to another aspect of the present invention, there is provided a damping force control system for an automotive vehicle having a set of semiactive damper mechanisms respectively provided between the vehicle body and a set of left and right road wheels to dampen vertical vibration of the vehicle body at the left and right road wheels, the control system including control means for switching over both the semiactive damper mechanisms from a low damping state to a high damping state in response to an increase of vertical vibration of the vehicle body at either one of the road wheels, which control system comprises first detection means for detecting vertical velocity of the vehicle body respectively at the left and right road wheels; second detection means for detecting the fact that either one of absolute values of the detected vertical velocities has exceeded a preselected magnitude of approximate zero; and means for permitting switchover of both the semiactive damper mechanisms from the low damping state to the high damping state upon lapse of a predetermined time after it has been detected by the second detection means that either one of the absolute values of the detected vertical velocity exceeded the preselected magnitude.

According to a further aspect of the present invention, there is provided a damping force control system for an automotive vehicle having a set of semiactive damper mechanisms respectively provided between the vehicle body and a set of left and right road wheels to dampen vertical vibration of the vehicle body at the left and right road wheels, the control system including control means for switching over both the semiactive damper mechanisms from a low damping state to a high damping state in response to an increase of vertical vibration of the vehicle body at either one of the road wheels, which control system comprises first detection means for detecting vertical velocity of the vehicle body respectively at the left and right road wheels; second detection means for detecting the fact that either one of absolute values of the detected vertical velocities has exceeded a preselected magnitude of approximate zero; means for permitting switchover of both the semiactive damper mechanisms from the low damping state to the high damping state upon lapse of a predetermined time when it has been detected by the second detection means that either one of the absolute values of the detected vertical velocities exceeded the preselected magnitude; and means for switching over both the semiactive damper mechanisms from the high damping state to the low damping state in accordance with an increase of a difference between times respectively at which it has been detected by the second detection means that each absolute value of the detected vertical velocities exceeded the preselected magnitude.

According to a still another aspect of the present invention, there is provided a damping force control system for an automotive vehicle having a set of semiactive damper mechanisms respectively provided between the vehicle body and a set of left and right road wheels to dampen vertical vibration of the vehicle body at the left and right road wheels, the control system including control means for switching over both the semiactive damper mechanisms from a low damping state to a high damping state in response to an increase of vertical vibration of the vehicle body at either one of the road wheels, which control system comprises first detection means for detecting vertical velocity of the vehicle body respectively at the left and right road wheels; second detection means for detecting the fact that either one of absolute values of the detected vertical velocities has exceeded a preselected magnitude of approximate zero; means for permitting switchover of both the semiactive damper mechanisms from the low damping state to the high damping state upon lapse of a predetermined time when it has been detected by the second detection means that either one of the absolute values of the detected vertical velocities exceeded the preselected magnitude; and means for decreasing each changing rate of damping forces of the semiactive damper mechanisms in accordance with an increase of a difference between times respectively at which it has been detected by the second detection means that each absolute value of the detected vertical velocities exceeded the preselected magnitude.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
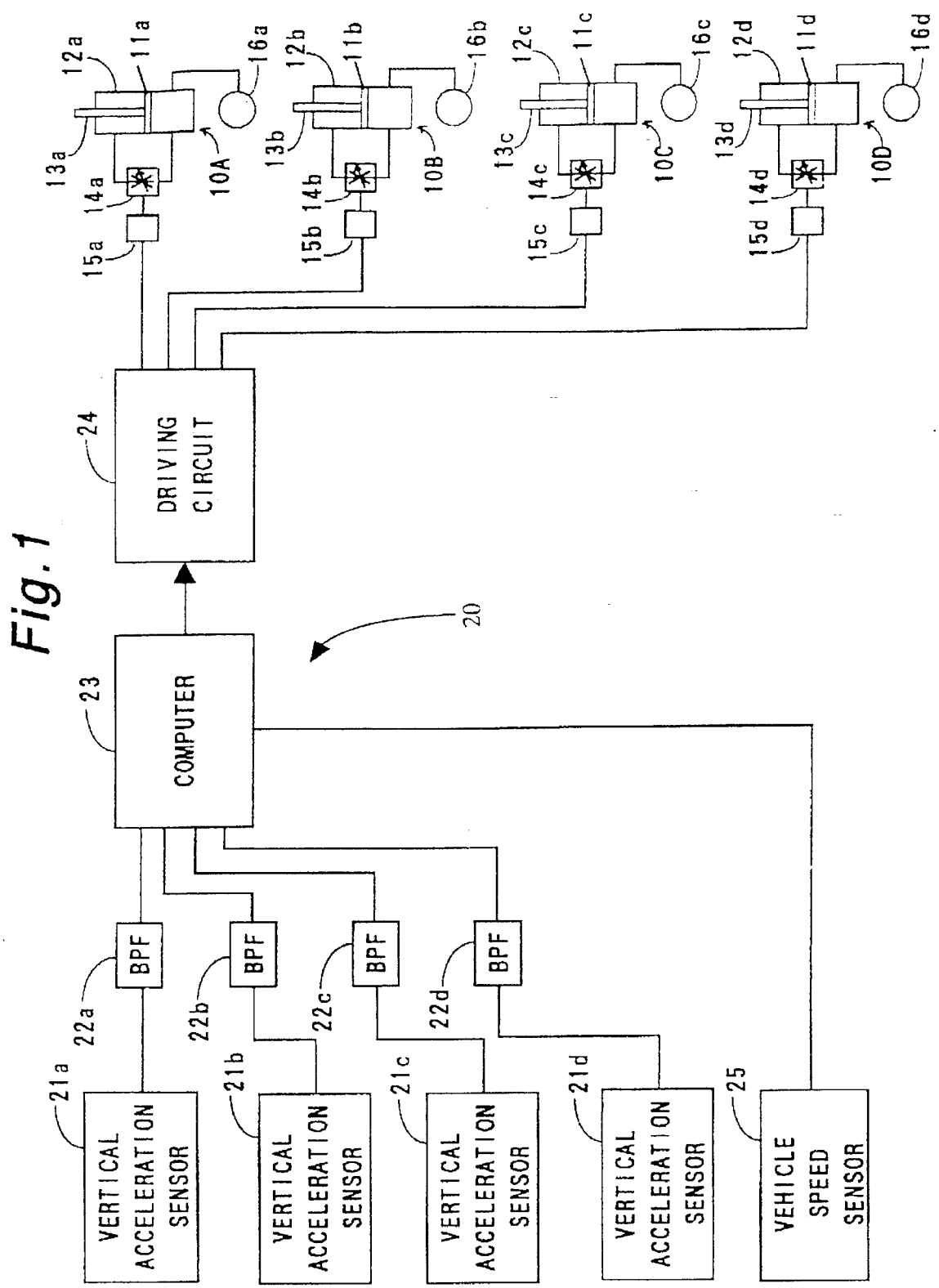
FIG. 1 is a schematic block diagram of a damping control system for an automotive vehicle in accordance with the present invention.

Illustrated in FIG. 1 of the drawings is a semiactive damper mechanism arranged to be operated under control of an electric control system 20. The semiactive damper mechanism is composed of shock absorbers 10A–10D which are provided between an unsprung mass and a sprung mass of an automotive vehicle. The shock absorbers 10A–10D include hydraulic cylinders 12a–12d respectively subdivided by pistons 11a–11d into upper and lower fluid chambers and supported on the unsprung mass of the vehicle. Piston rods 13a–13d of pistons 11a–11d are carried by the sprung mass of the vehicle. The upper and lower fluid chambers of hydraulic cylinders 12a–12d are interconnected through variable orifices 14a–14d, respectively. The opening degree of each of the variable orifices 14a–14d is switched over by operation of stepping motors 15a–15d to control each damping force of the shock absorbers 10A–10D at multiple steps. The lower fluid chambers of hydraulic cylinders 12a–12d are respectively connected to gas spring units 16a–16d which are provided to absorb each volume change of the fluid chambers caused by vertical movement of the piston rods 13a–13d.

The electric control system 20 includes vertical acceleration sensors 21a–21d mounted on the vehicle body structure at positions located respectively adjacent front and rear road wheels of the vehicle. The vertical acceleration sensors 21a–21d are arranged to detect vertical acceleration G caused by vibration of the vehicle body for producing an electric signal indicative of the detected vertical acceleration G. In this case, upward acceleration G is represented by a positive value, and downward acceleration G is represented by a negative value. A microcomputer 23 is connected to the vertical acceleration sensors 21a–21d through band-pass filters 22a–22d. Each of the band-pass filters 22a–22d has an integration function at a pass-band of 0.5–2.0 Hz corresponding with a resonant frequency of the vehicle body. Thus, the band-pass filters 22a–22d act to extract only a signal related to the resonant frequency of the vehicle body from the detected vertical acceleration G and to produce an electric signal indicative of vertical velocity of the vehicle body located adjacent the front and rear road wheels.

Figure 2:
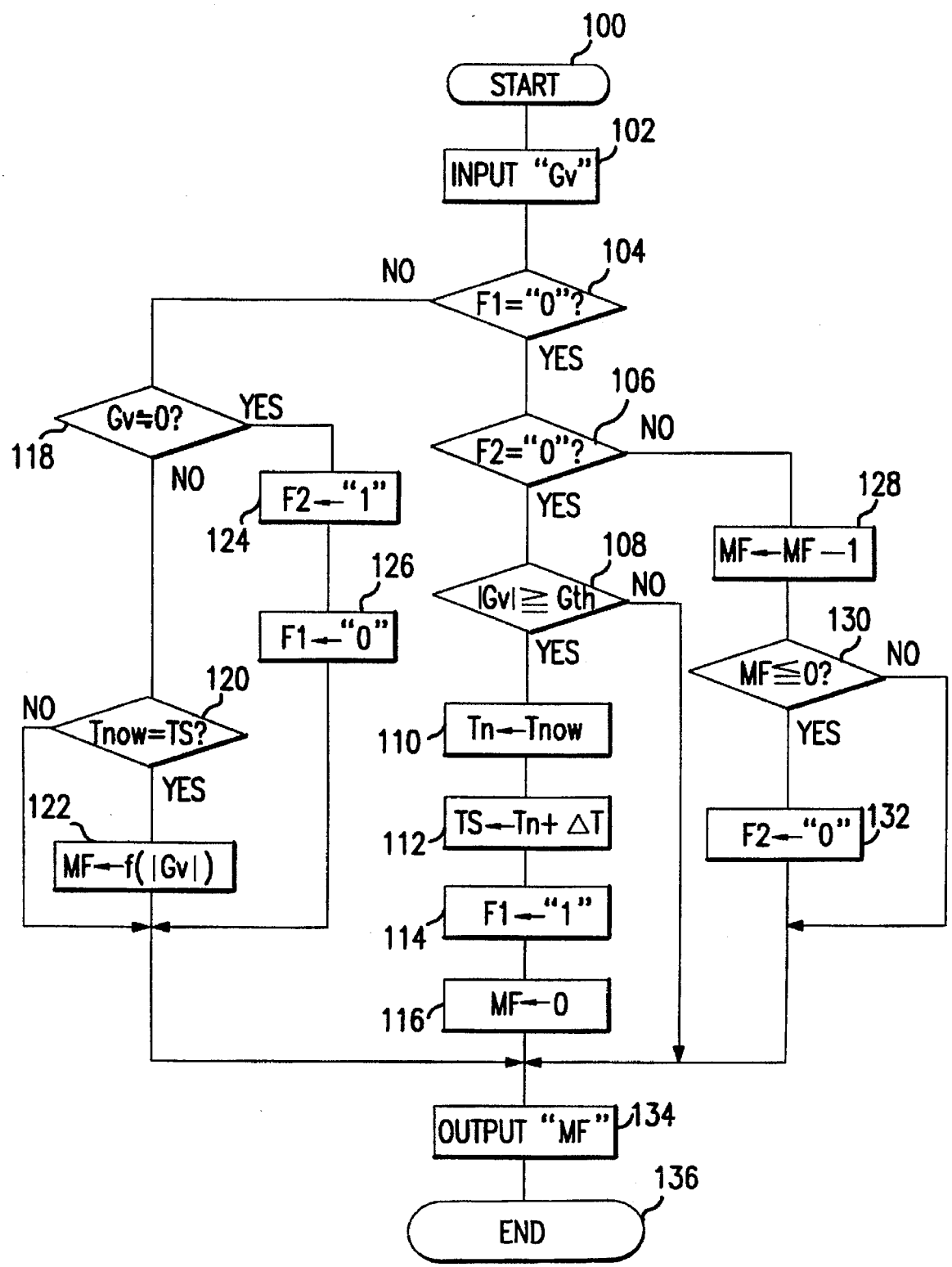
FIG. 2 is a flow chart of a first embodiment of a control program executed by a microcomputer shown in FIG. 1.
Figure 4:
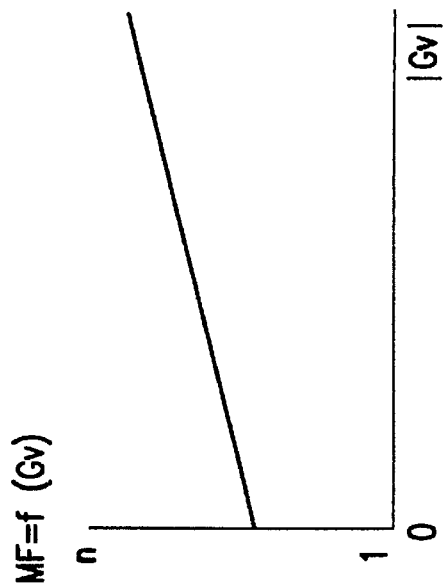
FIG. 4 is a graph showing a target step number in relation to vertical velocity of the vehicle body.

In a first embodiment of the present invention, the microcomputer 23 is designed to repeatedly execute a control program shown by a flow chart in FIG. 2 at a predetermined time interval under control a timer contained therein. Under control of the computer 23, the stepping motors 15a–15d are driven to control each opening degree of the variable orifices 14a–14d for controlling each damping force of the shock absorbers 10A–10D. The control program of FIG. 2 is arranged to correspond with the shock absorber 10A for the left front road wheel 10A. Accordingly, the control program of FIG. 2 is adapted to be executed by the computer 23 for controlling each damping force of the shock absorbers 10B–10D against vertical vibration of each portion of the vehicle body adjacent the other road wheels. The computer 23 is provided therein with a target step number table shown in FIG. 4 wherein a target step number MF for each of the shock absorbers 10A–10D is memorized in relation to the vertical velocity Gv of the vehicle body. The target step number MF corresponds with each step number of the stepping motors 15a–15d. Thus, each opening degree of the variable orifices 14a–14d is decreased in accordance with an increase of the step number MF to increase each damping force of the shock absorbers 10A–10D. The computer 23 is connected to a driving circuit 24 which acts to drive the stepping motors 15a–15d respectively in response to an electric control signal applied from the computer 23.

Hereinafter, control of a damping force against vertical vibration of the vehicle body at the left front road wheel will be described with reference to FIG. 2. Assuming that the computer 23 has been connected to an electric power source (not shown) by operation of an ignition switch (not shown) of the vehicle, the computer 23 initializes the control program of FIG. 2 and repeats execution of processing at step 100–136 of the program. During execution of the initialization, the computer 23 sets the target step number MF as "0" indicative of an initial condition of the shock absorber 10A and sets a changeover flag F1 and a return flag F2 respectively as "0". When the changeover flag F1 is set as "1", the computer 23 is conditioned to execute processing for switching over the damping force of the shock absorber 10A. When the return flag F2 is set as "1", the computer 23 is conditioned to execute processing for returning the damping force of the shock absorber 10A to an initial state.

When the program proceeds to step 102, the computer 23 is applied with an electric signal indicative of vertical velocity Gv of the vehicle body at the left front road wheel from the vertical acceleration sensor 21a through the band-pass filter 22a. Thereafter, the computer 23 determines at step 104 whether the changeover flag F1 is "0" or not and determines at step 106 whether the return flag F2 is "0" or not. Since the changeover flag F1 and return flag F2 are set respectively as "0" at an initial stage of operation, the computer 23 determines a "Yes" answer respectively at step 104 and 106 and causes the program to proceed to step 108. At step 108, the computer 23 determines whether an absolute value of the applied vertical velocity Gv is more than a threshold value Gth of approximately zero or not. If the answer at step 108 is "No", the computer 23 causes the program to proceed to step 134.

At step 134, the computer 23 produces an electric control signal indicative of the target step number MF set as "0" and applies it to the driving circuit 24. In turn, the driving circuit 24 memorizes the control signal and activates the stepping motor 15a based on the memorized control signal to set it in a rotational position defined by the target step number MF(0). In this instance, the opening degree of variable orifice 14a is maximized to set the damping force of the shock absorber 10A in the lowest damping state. Accordingly, when the absolute valve of vertical velocity Gv is less than the threshold value Gth, the shock absorber 10A is maintained in the lowest damping state to ensure good riding comfort of the vehicle.

Figure 3:
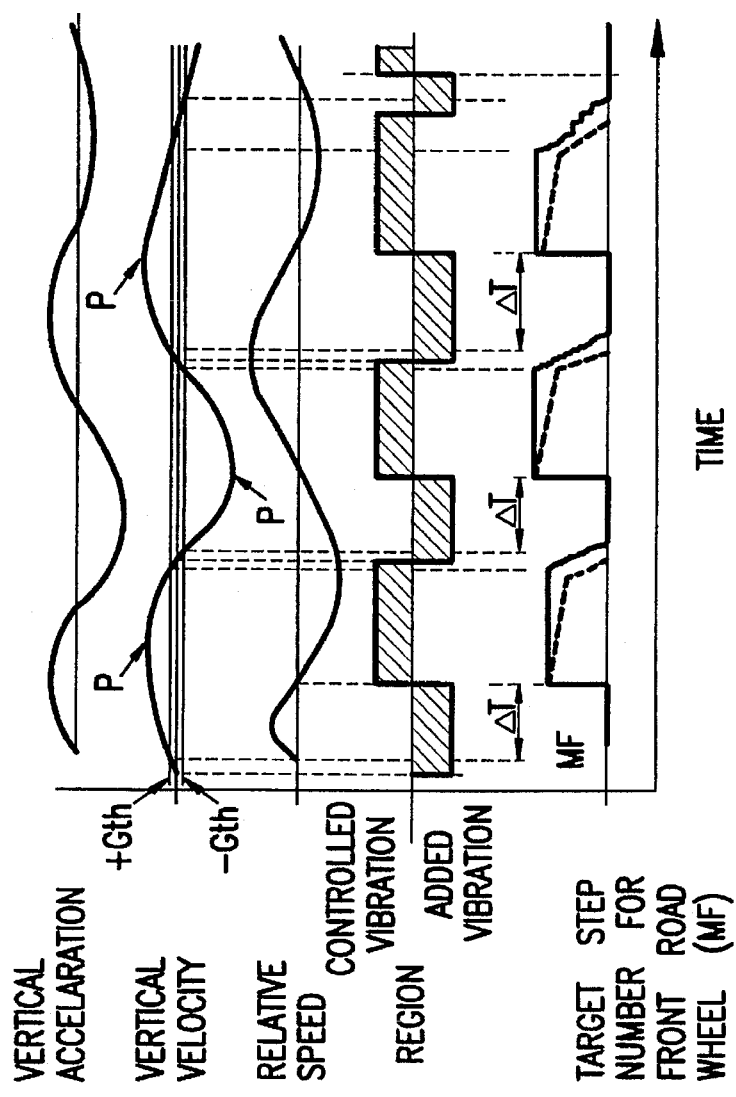
FIG. 3 is a time chart showing vertical acceleration and vertical velocity of the vehicle body, vertical relative velocity between an unsprung mass and a sprung mass of the vehicle, and target step number for a shock absorber of a front road wheel.

Assuming that the vehicle has been raised by a stepped portion on a travel road, the absolute value of vertical velocity Gv exceeds the threshold value Gth due to vertical vibration of the vehicle body. In this instance, the computer 23 determines a "Yes" answer at step 108 and causes the program to proceed to step 110–116. At step 110, the computer 23 sets the present time Tnow measured by a timer circuit stored therein as a passing time Tn. At the following step 112, the computer 23 adds a predetermined retard time ΔT to the passing time Tn and set a resultant of the addition as a start time TS for control of the shock absorber 10A. As shown in FIG. 3, the retard time ΔT is determined to correspond with a phase amount during which relative velocity between the sprung mass and the unsprung mass is delayed from vertical velocity Gv related to a resonant frequency included in vertical vibration of the vehicle body. Subsequently, the computer 23 sets at step 114 the changeover flag F1 as "1" and sets at step 116 the target step number MF as "0". After processing at step 110–116, the computer 23 controls at step 134 the damping force of the shock absorber 10A to a target damping force defined by the target step number MF. In such an instance, the shock absorber 10A is still maintained in the lower damping state.

When the control program of FIG. 2 is returned to step 104, the computer 23 determines a "No" answer and causes the program to proceed to step 118. At step 118, the computer 23 determines whether the vertical velocity Gv applied at step 102 is approximately zero or not. Since in this instance, the vertical velocity Gv exceeds the threshold value Gth, the computer 23 determines a "No" answer at step 118 and causes the program to proceed to step 120. At step 120, the computer 23 determines whether the present time Tnow is equal to the start time TS or not. If the present time Tnow does not become the start time TS, the computer 23 determines a "No" answer at step 120 and causes the program to proceed to step 134. In this instance, the shock absorber 10A is still maintained in the lowest damping state.

When the present time Tnow becomes the start time TS at which the relative velocity between the sprung mass and the unsprung mass becomes approximately zero, the computer 23 determines a "Yes" answer at step 120 and causes the program to proceed to step 122. At step 122, the computer 23 determines the target step number MF with reference to the target step number table shown in FIG. 4. After processing at step 122, the computer 23 sets at step 134 the damping force of the shock absorber 10A to a target damping force defined by the target step number MF and switches over at step 134 the shock absorber 10A to a high damping state to dampen the vertical vibration of the vehicle body. Since the relative velocity between the sprung mass and the unsprung mass is approximately zero at the start time TS, any movement of hydraulic fluid between the upper and lower chambers of hydraulic cylinder 12b does not occur. Thus, undesirable shocks and noises caused by switchover of the variable orifice can be restrained.

When the vertical velocity Gv becomes approximately zero before the present time Tnow becomes the start time TS, the computer 23 determines a "Yes" answer at step 118 and resets the changeover flag F1 to "0" at step 126. In this instance, the shock absorber 10A may not be switched over to the high damping state.

Until the vertical velocity Gv of the vehicle body becomes zero in a condition where the shock absorber 10A has been switched over to the high damping state, the computer 23 determines a "No" answer respectively at step 118 and 120 and causes the program to proceed to step 134 in a condition where the target step number MF is maintained at the previously set value. In this instance, the shock absorber 10A is maintained at the high damping state.

When the vertical velocity Gv of the vehicle body becomes approximately zero, the computer 23 determines a "Yes" answer at step 118 and causes the program to proceed to step 124 and 126. Thus, the computer 23 sets the return flag F2 as "1" at step 124 and resets the changeover flag F1 to "0" at step 126. During further execution of the control program of FIG. 2, the computer 23 determines a "No" answer at step 108 and causes the program to proceed to step 128–132. During execution of processing at step 128–132, the target step number MF is reduced by subtraction of "1" therefrom until it becomes "0", and the return flag F2 is reset to "0" when the target step number MF becomes "0". Thus, the damping force of the shock absorber 10A is gradually decreased. After the return flag F2 has been reset to "0", the shock absorber 10A is maintained at the lowest damping state.

Although in the foregoing operation, the shock absorber 10A at the left front road wheel has been controlled by execution of the program of FIG. 2, the other shock absorbers 10B, 10C and 10D are controlled by execution of the program of FIG. 2 in the same manner as described above. In such control, the computer 23 is applied with electric signals indicative of each vertical velocity Gv at the right front road wheel and the left and right rear road wheels from the vertical acceleration sensors 21b–21d through the band-pass filters 22b–22d.

From the above description, it will be understood that when vibration of the vehicle body at the respective road wheels increases, the shock absorbers 10A–10D each are switched over to a high damping state to restrain the vibration of the vehicle body. In such operation, the relative velocity between the sprung mass and the unsprung mass is estimated on a basis of the vertical velocity Gv so that the shock absorbers each are switched over from the lowest damping state to the high damping state at the time when the relative velocity becomes zero. Accordingly, even if the damping force is suddenly switched over, undesirable shocks and noises caused by switchover of the shock absorbers can be reduced in a simple construction. When the shock absorbers are switched over from the high damping state to the lowest damping state, the damping force is gradually decreased. In this instance, undesirable shocks and noises can be also reduced.

In such control of the shock absorbers as described above, the damping force is increased when the sign of the vertical velocity Gv coincides with the sign of the relative velocity as shown in FIG. 3, whereas the damping force is decreased when the sign of the vertical velocity Gv does not coincide with the sign of the relative velocity. In this instance, the velocity Gv in upward movement of the vehicle body is represented by a positive sign while the velocity Gv in downward movement of the vehicle body is represented by a negative sign. It is also to be noted that expansion of the shock absorbers 10A–10D is represented by a positive sign while contraction of the shock absorbers is represented by a negative sign. When the road wheels are raised by a stepped portion on a travel road or immediately before the road wheels run out of a recessed portion in a travel road, the vertical velocity Gv becomes positive while the relative velocity becomes negative. If in such a condition the damping force is increased, the vehicle body is raised to deteriorate riding comfort of the vehicle. Immediately after the road wheels have run over the stepped portion on the travel road or the road wheels have fallen into the recessed portion, the vertical velocity Gv becomes negative while the relative velocity becomes positive. If in such a condition the damping force is increased, the vehicle body is suddenly fallen to deteriorate riding comfort of the vehicle.

Since in the embodiment the vertical velocity Gv is compared with the threshold Gth at step 108, each damping force of the shock absorbers 10A–10D is maintained at the lowest damping state when the vertical velocity Gv is approximately zero. This is effective to avoid frequent switching of the shock absorbers.

Figure 5:
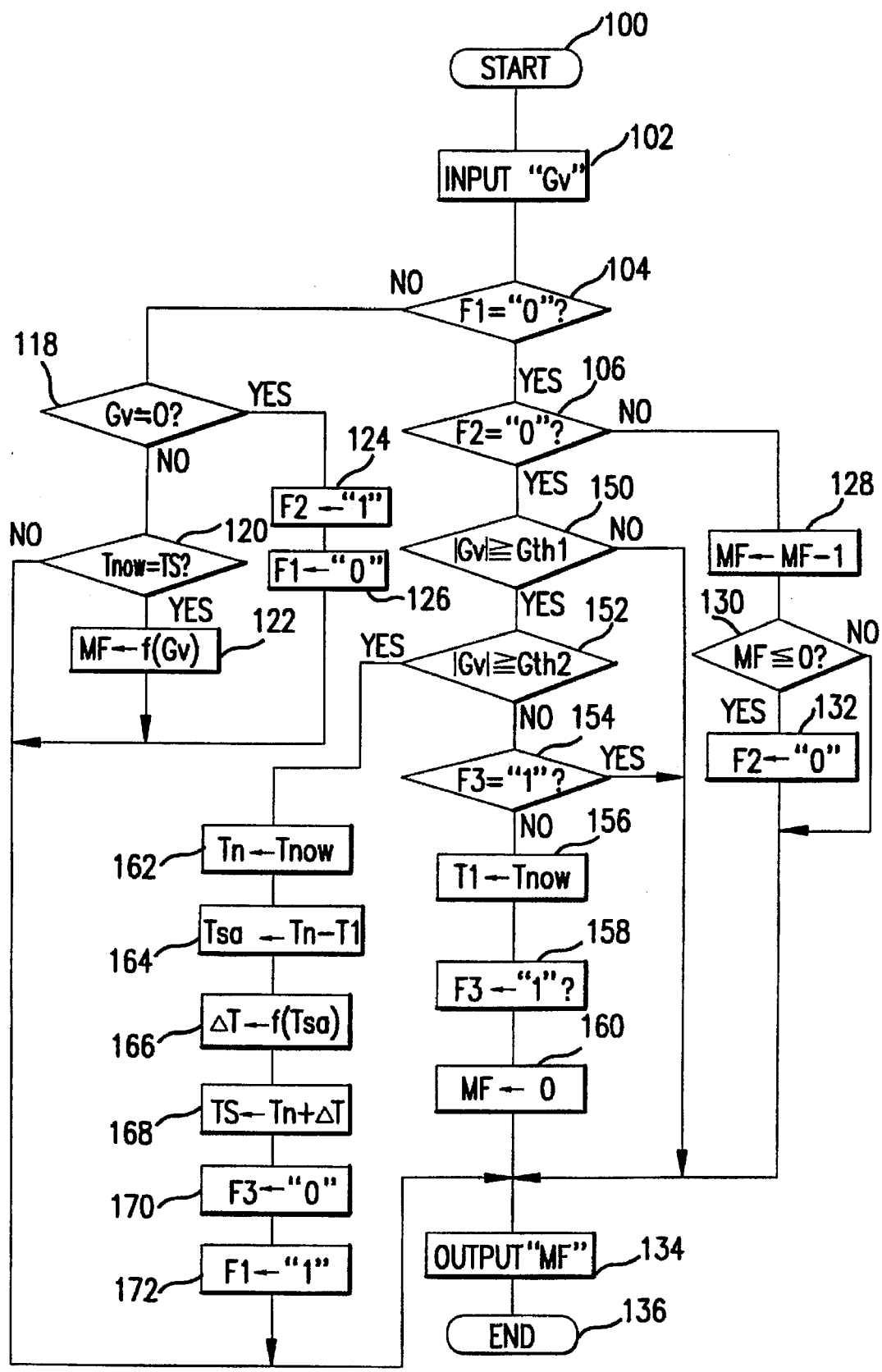
FIG. 5 is a flow chart of a first modification of the control program shown in FIG. 2.

In FIG. 5 there is illustrated a first modification of the control program of FIG. 2 wherein processing at step 150–172 is substituted for processing at step 108–116 of FIG. 2. In this modification, a changing rate detection flag F3 for detecting a changing rate of the vertical velocity Gv is used in addition to the changeover flag F1 and return flag F2, The changing rate detection flag F3 is set as "0" by initialization of the program.

Figure 6:
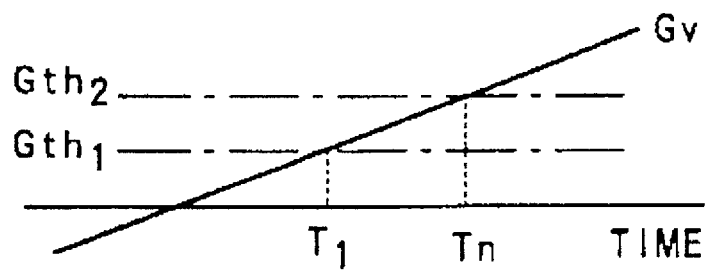
FIG. 6 is a time chart illustrating vertical velocity of the vehicle body.

Assuming that the absolute value of the vertical velocity Gv is less than a first threshold value Gth1 during repetitive execution of the program, the computer 23 determines a "Yes" answer respectively at step 104, 106 and determines a "No" answer at step 150. Thus, the program proceeds to step 134 as in the first embodiment. Accordingly, when the vertical velocity Gv is small, the shock absorbers 10A–10D are set in the lowest damping state. When the absolute value of the vertical velocity Gv becomes more than the first threshold value Gth1 due to increase of the vertical vibration of the vehicle body, the computer 23 determines a "Yes" answer at step 150 and causes the program to proceed to step 152. At step 152, the computer 23 determines whether or not the absolute value of the vertical velocity Gv is more than a second threshold value Gth2 slightly higher than the first threshold value Gth1. (see FIG. 6) Immediately after the absolute value of the vertical velocity Gv has exceeded the first threshold value Gth1, it is still less than the second threshold value Gth2. Thus, the computer 23 determines a "No" answer at step 152 and determines a "No" answer at step 154 based on the initialized detection flag F3. When the program proceeds to step 156 based on the determination at step 154, the computer 23 sets the present time Tnow as a detection start time T1 as in the first embodiment. Subsequently, the computer 23 sets at step 158 the detection flag F3 as "1" and sets at step 160 the target step number MF as "0". After processing at step 156–160, the computer 23 executes processing at step 134 to maintain the shock absorbers 10A–10D in the lowest damping state as in the first embodiment.

Figure 7:
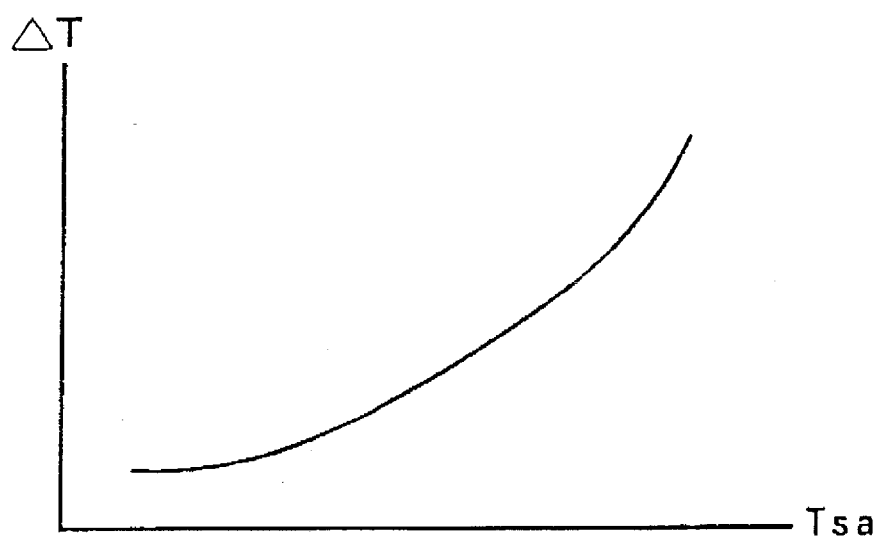
FIG. 7 is a graph showing a retard time reversely in proportion to a changing rate of vertical velocity of the vehicle.

If the absolute value of the vertical velocity Gv is still less than the second threshold value Gth2 during further execution of the program, the computer 23 determines a "Yes" answer at step 150 and determines a "No" answer at step 152. Thereafter, the computer 23 determines a "Yes" answer at step 154 since the detection flag F3 is previously set as "1" and causes the program to proceed to step 134 to maintain the shock absorbers in the lowest damping state. When the absolute value of the vertical velocity Gv exceeds the second threshold value Gth2, the computer 23 determines a "Yes" answer at step 152 and causes the program to proceed to step 162. Thus, the computer 23 sets at step 162 the present time Tnow as a passing time Tn and subtracts the detection start time T1 from the passing time Tn to calculate lapse of a time Tsa during which the absolute value of the vertical velocity Gv exceeds the second threshold value Gth2 after reached the first threshold value Gth1. At the following step 166, the computer 23 determines a retard time $\Delta T$ corresponding with lapse of the time Tsa with reference to a retard time table memorized therein. As shown in FIG. 7, the retard time $\Delta T$ increases in accordance with an increase of lapse of the time Tsa. Since lapse of the time Tsa is reversely in proportion to a changing rate of the vertical velocity Gv, the calculation of lapse of the time Tsa at step 164 is equivalent to calculation of the changing rate of the absolute value of the vertical velocity Gr. Accordingly, the changing rate is increased by processing at step 166. That is to say, the retard time $\Delta T$ is set as a short time when lapse of the time Tsa becomes small. This means that the changing rate of the vertical velocity Gv to relative velocity between the vehicle body and the road wheels is related to the resonant frequency of the vehicle body and that when the resonant frequency increases, each changing rate of the vertical velocity Gv to the relative velocity increases while the retard time of the relative velocity from the vehicle speed becomes short.

After processing at step 166, the computer 23 adds at step 168 the retard time $\Delta T$ to the passing time Tn and sets a resultant of the addition as a control start time TS. Subsequently, the computer 23 sets at step 170 the detection flag F3 as "0", at step 172 the changeover flag F1 as "1" and causes the program to proceed to step 134. Thus, each damping force of shock absorbers 10A-10D is switched over to a high damping state by processing at step 118-126.

From the above description, it will be understood that the retard time $\Delta T$ is shortened in accordance with an increase of the changing rate of the vertical velocity Gv to accurately switch over the shock absorbers at the time when the relative velocity between the vehicle body and the road wheels has become approximately zero. With such control of the retard time $\Delta T$, undesirable shocks and noises caused by switchover of the damping force can be more effectively reduced, and the damping force can be precisely controlled at the foregoing vibratory region and attenuation region.

Figure 8:
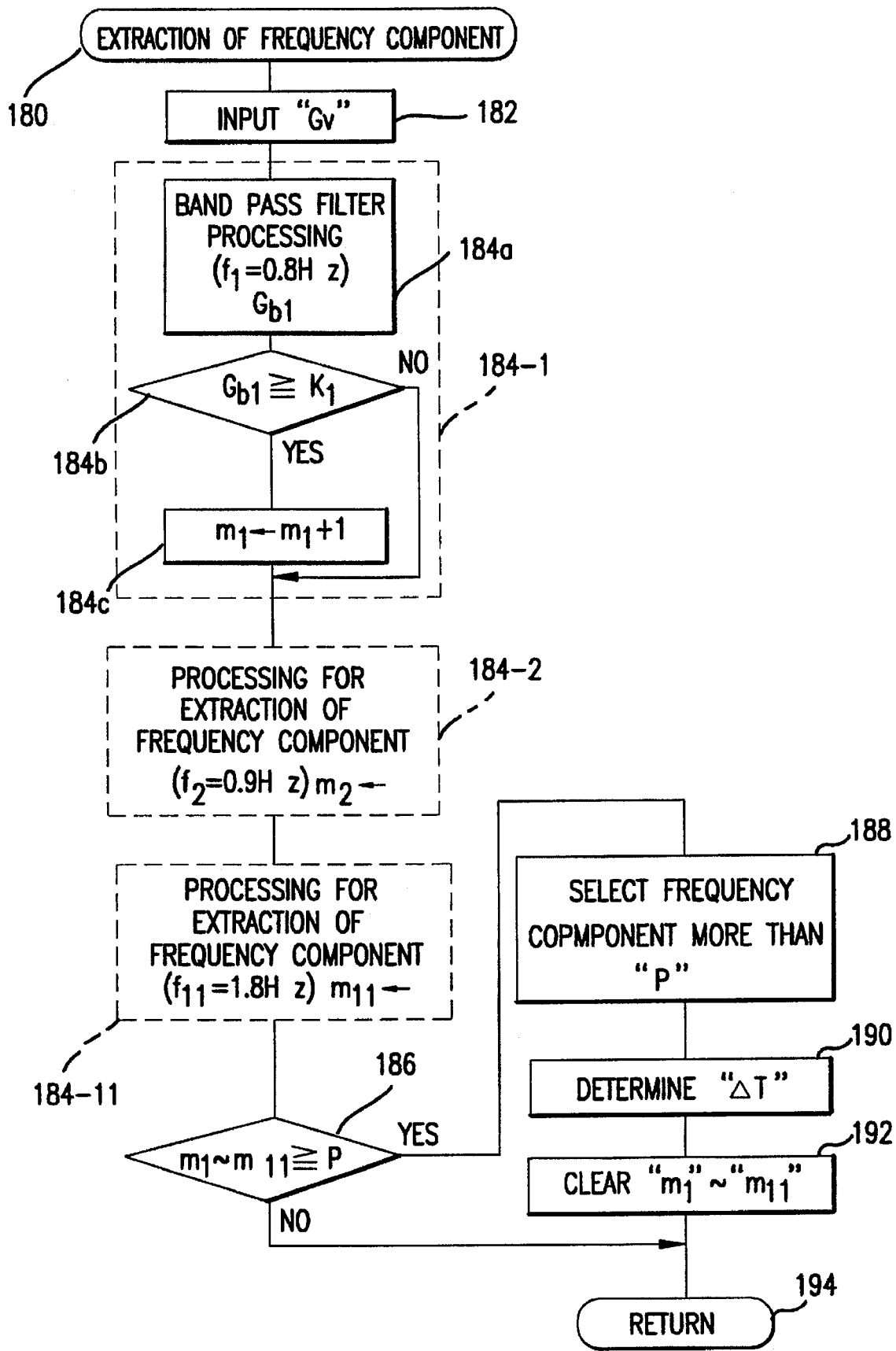
FIG. 8 is a flow chart of a second modification of the control program shown in FIG 2.

In FIG. 8 there is illustrated a second modification of the first embodiment wherein during execution of the control program of FIG. 2, the computer 23 repeatedly executes a frequency component extraction program at the predetermined time interval to correct the retard time $\Delta T$ in accordance with a frequency component included in the vertical vibration of the vehicle body as described below. In the case that the load of computer 23 becomes too large, another microcomputer may be used to execute the frequency component extraction program.

Figure 9:
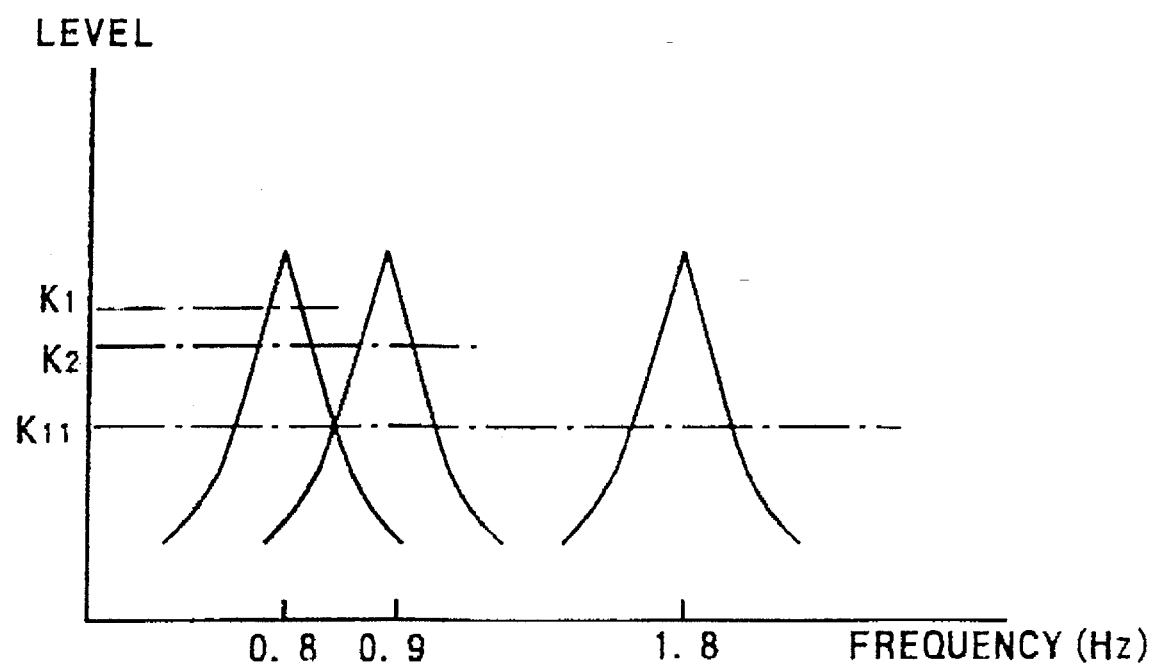
FIG. 9 is a graph showing a characteristic of a band-pass filter adapted to the second modification.

Assuming that the computer 23 has initiated execution of the frequency component extraction program at step 180 shown in FIG. 8, the computer 23 is applied with the vertical velocity Gv of the vehicle body at step 182 and applies at step 184a band-pass filter processing of a narrow band to the input data indicative of the vehicle velocity Gv to extract a frequency component of approximate 0.8 Hz and to set an instant value indicative of the extracted frequency component as a first frequency component level $G_{b1}$. Thereafter, the computer 23 determines at step 184b whether the first frequency component level $G_{b1}$ is higher than a predetermined standard level $K_1$ or not. (see FIG. 9) If the answer at step 184b is "Yes", the program proceeds to step 184c where the computer 23 adds "1" to a first count value $m_1$. If the answer at step 184b is "No", the program proceeds to step 184-2 and 184-11 where the computer 23 increases a count value $m_1$ corresponding with a frequency band the frequency component level $G_{b1}$ of which is higher than a standard level $k_1$.

After processing at step 184-1 to 184-11, the computer 23 determines at step 186 whether either one of count values $m_1$–$m_{11}$ is more than a predetermined value "p" or not. If either the count values $m_1$–$m_{11}$ are less than the predetermined value p, the computer 23 determines a "No" answer at step 186 until either one of the count values $m_1$–$m_{11}$ becomes more than the predetermined value "p" and causes the program to proceed to step 194 where the computer 23 finishes execution of the frequency component extraction program. The processing at step 182, 184-1 to 184-11 corresponds with detection of a vibration frequency of the vehicle velocity Gr. When either one of the count values $m_1$–$m_{11}$ becomes more than the predetermined value "p", the computer 23 determines a "Yes" answer at step 186 and causes the program to proceed to step 188.

Figure 10:
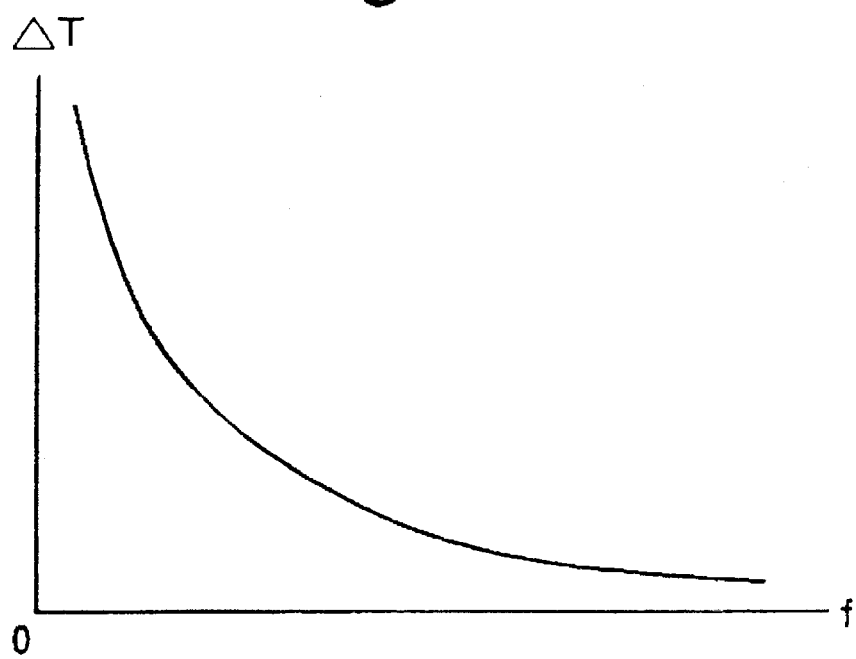
FIG. 10 is a graph showing a retard time in relation to a pass-band of the filter adapted to the second modification.

At step 188, the computer 23 selects a frequency component corresponding with a count value $m_i(i=1-11)$ more than the predetermined value "p" (a central frequency of the band-pass filter processing) and sets the selected frequency component as an extraction frequency f. At the following step 190, the computer 23 determines a retard time $\Delta T$ in accordance with the extraction frequency f with reference to a retard time table shown in FIG. 10. After processing at step 190, the computer 23 resets all the count values $m_1$–$m_{11}$ to "0" at step 192 and finishes execution of the frequency component extraction program at step 194. Thus, the computer 23 sets at step 112 of FIG. 2 the retard time $\Delta T$ as a control start time TS. As is understood from the above description, the retard time $\Delta T$ is set as a small value in accordance with an increase of the vibration frequency of the vehicle body. Accordingly, even if the resonant frequency of the vehicle body increases, each damping force of the shock absorbers can be precisely switched over at the time when the relative velocity between the vehicle body and the road wheels becomes zero. With such control of the retard time $\Delta T$, undesirable shocks and noises caused by switchover of the damping force can be more effectively reduced, and the damping force can be precisely controlled at the foregoing vibratory region and attenuation region.

Hereinafter, a third modification of the first embodiment will be described with reference to FIGS. 11 and 12. In this modification, the control program of FIG. 2 is modified to be effective in the occurrence of continual vibration of the vehicle during travel on a rough road.

Figure 11:
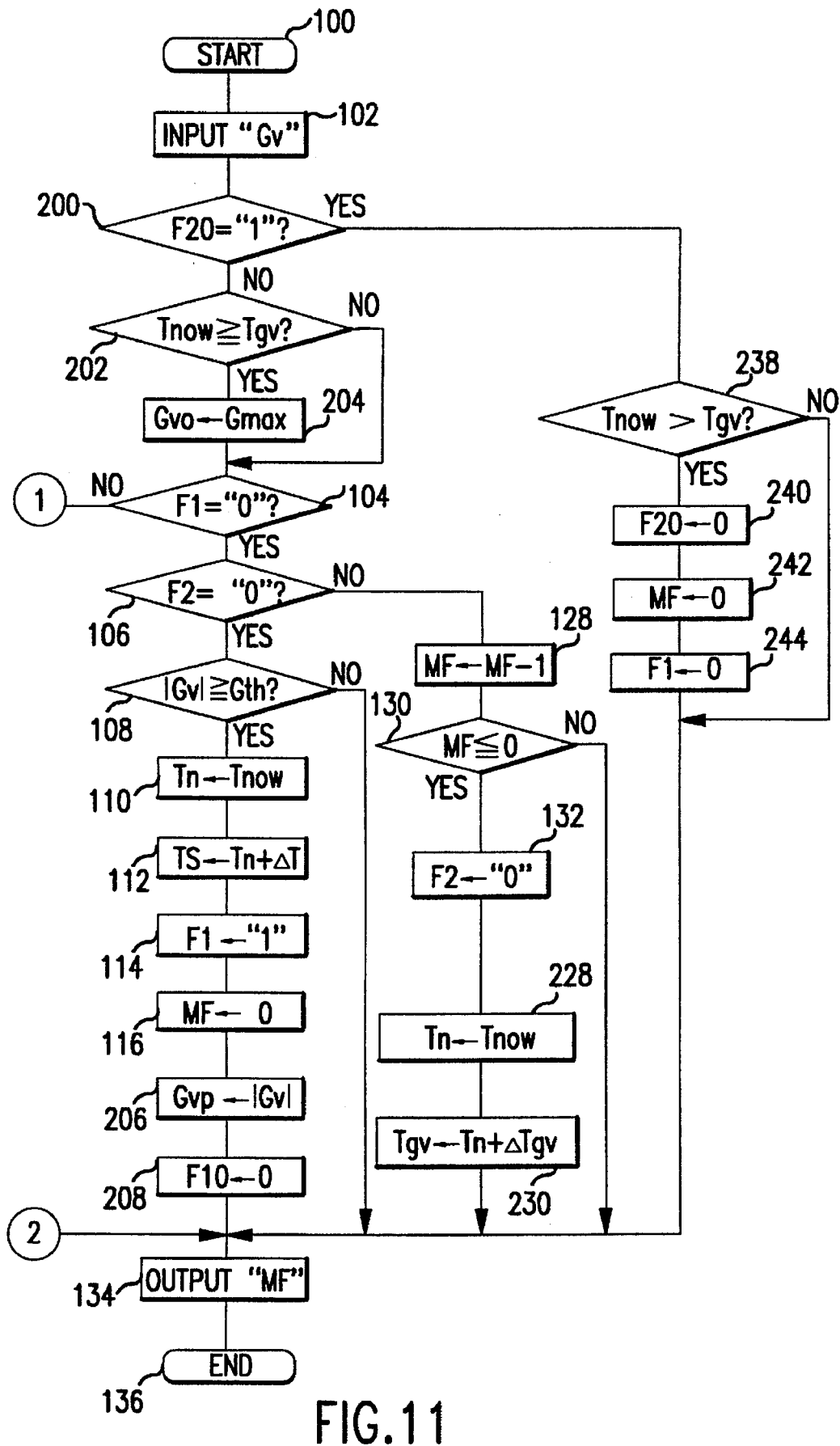
FIGS. 11 and 12 illustrate a flow chart of a third modification of the control program shown in FIG. 2.

Assuming that the computer 23 has initiated to execute the program shown in FIG. 11 at step 100, the computer 23 is applied with vertical velocity Gv of the vehicle body at step 102 and determines at step 200 whether a continual vibration flag F20 is "1" or not. The continual vibration flag F20 represents a continually vibrated condition of the vehicle when it is set as "1". Since the continual vibration flag F20 is set as "0" at an initial stage, the computer 23 determines a "No" answer at step 200 and causes the program to proceed to step 202 and 204. At step 202, the computer 23 determines whether or not the present time Tnow elapses a release time Tgv for releasing a previous peak value Gvo indicative of a peak value of previous vertical velocity Gv of the vehicle body. Since the release time Tgv is set as "0" at this initial stage, the computer 23 determines a "Yes" answer at step 202 and sets the previous peak valve Gvo as a predetermined maximum value Gmax.

When the absolute value of the vertical velocity Gv is less than the threshold value Gth during processing at the following step 104–108, the computer 23 determines a "No" answer at step 108 to maintain the shock absorbers 10A–10D in the lowest damping state as in the first embodiment. When the absolute value of the vertical velocity Gv exceeds the threshold value Gth, the computer 23 determines a "Yes" answer at step 108 and executes processing at step 110–116, 134 and 120a, 122 of FIG. 12 during which the shock absorbers 10A–10D are switched over from the lowest damping state to a high damping state in accordance with the target step number MF determined on a basis of the vertical velocity Gv after lapse of the retard time ΔT in the same manner as in the first embodiment. Provided that, the computer 23 continually determines a "Yes" answer at step 120a when the present time Tnow is more than the start time TS. In this instance, the target step number MF is decreased by processing at step 122 in accordance with a decrease of the absolute value of the vertical velocity Gv as shown broken lines in FIG. 3. When the vertical velocity Gv becomes approximately zero, the computer 23 executes processing at step 118, 124, 126 of FIG. 12 and 106, 128–134 of FIG. 11 during which each damping force of the shock absorbers is gradually decreased and set in the lowest damping state as in the first embodiment.

When the absolute value of the vertical velocity Gv becomes more than the threshold value Gth during such control of the damping force as described above, the computer 23 sets at step 206 of FIG. 11 the absolute value of the vertical velocity Gv as a variable Gvp for calculation of a peak value of the vertical velocity Gv and sets at step 208 a peak detection flag F10 as "0". The peak detection flag F10 is set as "1" when a peak value of the vertical velocity Gv has been calculated as follows. After determined a "No" answer at step 118 of FIG. 2, the computer 23 calculates a peak value of the vertical velocity Gv by processing at step 210–216. (see FIG. 3) Since the absolute value of instant vertical velocity Gv exceeds the variable Gvp indicative of the absolute valve of the previous vertical velocity Gv until the vertical velocity Gv reaches a peak value, the computer 23 determines a "Yes" respectively at step 210 and 212 and renews the variable Gvp as the absolute value of instant vertical velocity Gr. When the vertical velocity Gv exceeds the peak value, the absolute value of instant vertical velocity Gv becomes smaller than the variable Gvp. Thus, the computer 23 determines a "No" answer at step 212 and sets the peak detection flag F10 as "1". As a result, the peak value of the vertical velocity Gv is represented by the variable Gvp until the peak detection flag F10 is reset to "0".

When the peak value of the vertical velocity Gv is detected, the computer 23 determines a "Yes" answer at step 220 after processing at step 218 and renews at step 222 a previous peak value Gvo as the detected peak valve Gvp. Subsequently, the computer 23 renews at step 224 the variable Gvp as an absolute value of instant vertical velocity Gv and resets at step 226 the peak detection flag F10 to "0". With such processing as described above, the previous peak value Gvo is successively renewed as a peak value of the vertical velocity Gv.

Figure 12:
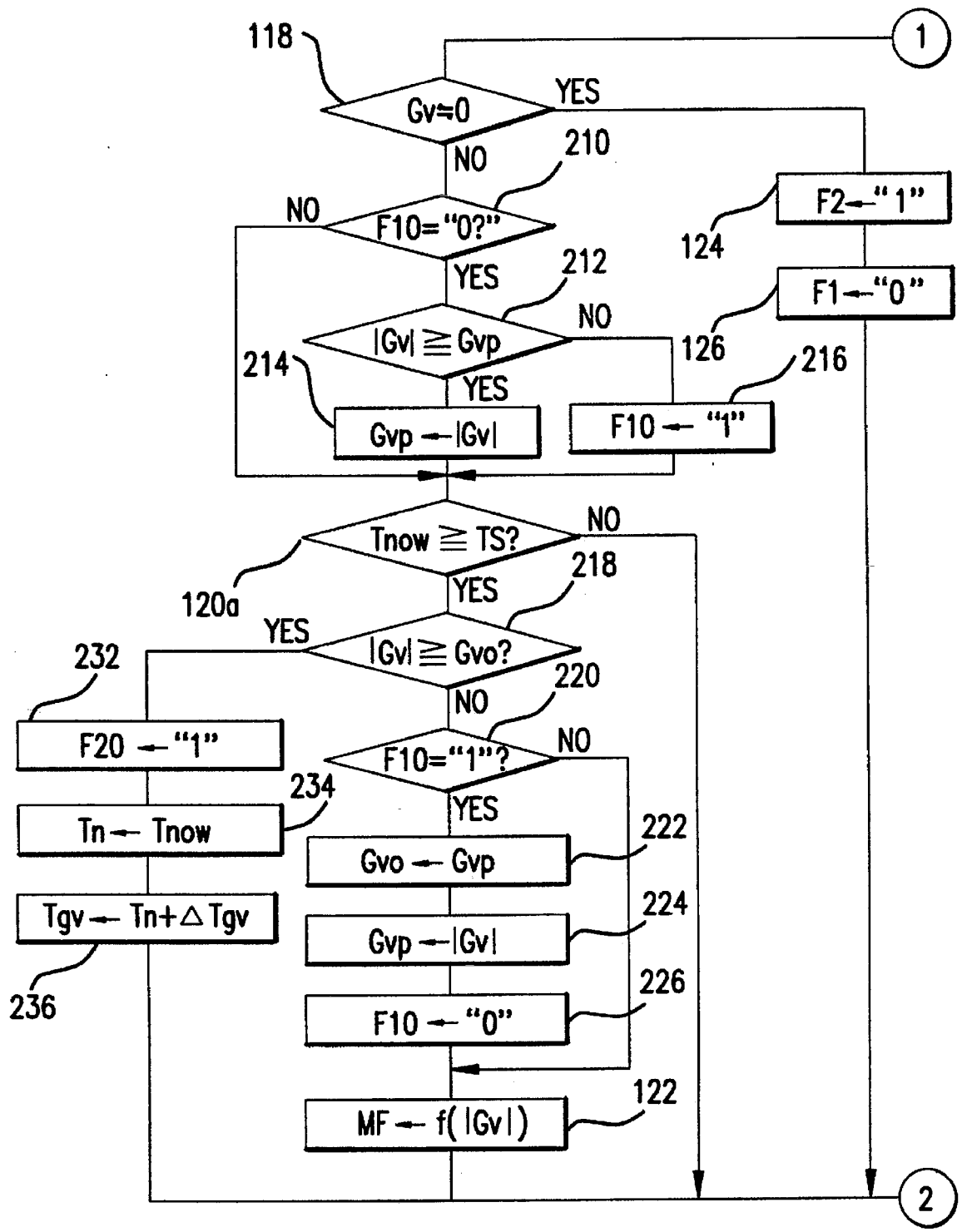

At each time when the shock absorbers are set in the lowest damping state during execution of the program shown in FIGS. 11 and 12, the computer 23 executes processing at step 228 and 230 of FIG. 11 to set the release time Tgv as a time advanced by a predetermined time ΔTgv from the present time Tnow (more than 1.5 times a vibration period of the vehicle body) This means that the release time Tgv is maintained in a greater value than the present time Tnow during vibration of the vehicle body. As a result, the computer 23 determines a "No" answer at step 202 to maintain the previous peak value Gvo as the peak value of the variable Gvp. In a condition where there is not any vibration of the vehicle body, the release time Tgv may not be renewed. In such an instance, the present time Tnow becomes more than the release time Tgv, and the previous peak value Gvo is set as the maximum value Gmax by processing at step 202 and 204.

In the occurrence of continual vibration of the vehicle body during travel on a rough road, the relative velocity between the vehicle body and the road wheels does not change sinuously as shown in FIG. 3. In this instance, a phase delay amount of the relative velocity to the vertical velocity Gv fluctuates, and also the vertical velocity Gv does not change sinuously. It is, therefore, assumed that the shock absorbers are suddenly switched over or maintained at the lowest damping state in a condition where the relative velocity is other than zero. To avoid such an undesired state, it is preferable that the shock absorbers may not be switched over or maintained in a high damping state.

In this modification, the computer 23 is programmed to compare the absolute value of the vertical velocity Gv with the previous peak value Gvo at step 218 shown in FIG. 12. If the absolute value of the vertical velocity Gv is less than the previous peak value Gvo, the computer 23 determines a "No" answer at step 218 to switch over the shock absorbers 10A–10D in response to the vibration period as described above. If the absolute value of the vertical velocity Gv exceeds the previous peak value Gvo, the computer 23 determines a "Yes" answer at step 218 and causes the program to proceed to step 232–236. At step 232, the computer 23 sets the continual vibration flag F20 as "1" and sets the release time Tgv as a time advanced by the predetermined time ΔTgv from the present time Tnow by processing at step 234 and 236. Thereafter, the computer 23 determines a "Yes" answer at step 200 of FIG. 11 during further execution of the program and causes the program to proceed to step 238–244. Until the present time Tnow becomes the release time Tgv, the computer 23 determines a "No" answer at step 238 and causes the program to proceed to step 134. Thus, each damping force of the shock absorbers is maintained in a high damping state set by processing at step 122 of FIG. 12 before the absolute value of the vertical velocity Gv exceeds the previous peak value Gvo.

When the present time Tnow passes the release time Tgv upon lapse of the predetermined time ΔTgv after the continual vibration flag F20 has been set as "1", the computer 23 determines a "Yes" answer at step 238 and causes the program to proceed to step 240–244. During processing at step 240–244, the continual vibration flag F20, target step number MF and changeover flag F1 each are reset to "0". Thus, the shock absorbers 10A–10D each are subsequently set in the lowest damping state by processing at step 134. Under such a condition, the previous peak value Gvo is set again as the maximum value Gmax by processing at step 202 and 204 of FIG. 11 during the following execution of the program.

As is understood from the above description, the shock absorbers 10A–10D are controlled in the same manner as in the first embodiment in a condition where the vehicle body is not continually applied with any vibration from the travel road. When the vehicle body is applied with continual vibration from the travel road, the peak value is detected by processing at step 210–216 of FIG. 12, the previous peak value Gvo is renewed by processing at step 220–226, and the vertical velocity Gv is compared with the previous peak value Gvo by processing at step 218 to maintain the shock absorbers 10A–10D in a high damping state for the predetermined time Tv. With such control as described above, it is able to avoid the fact that the shock absorbers are suddenly switched over in a condition where the relative velocity between the vehicle body and the road wheels or the shock absorbers are maintained at the lowest damping state in an attenuation region.

Figure 13:
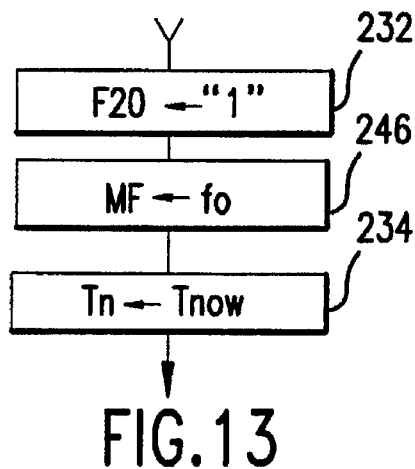
FIG. 13 is a flow chart of a modification of the control program shown in FIGS. 11 and 12.
Figure 14:
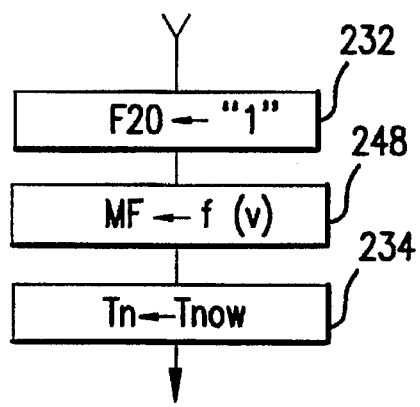
FIG. 14 is a flow chart of another modification of the control program shown in FIGS. 11 and 12.
Figure 15:
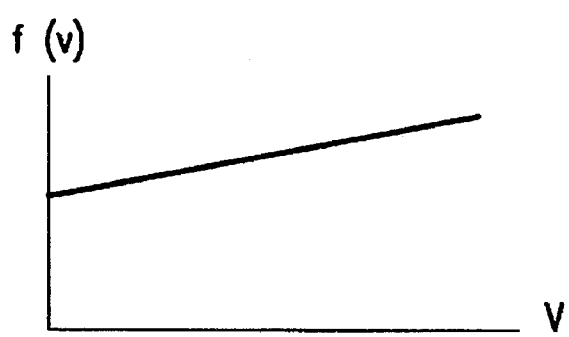
FIG. 15 is a graph showing a target step number in relation to a vehicle speed.

In the modification described above, processing for setting the target step number MF to a predetermined value $f_0$ indicative of a higher step number may be inserted between step 232 and 234 at step 246 as shown in FIG. 13. Alternatively, processing for setting the target step number MF to a predetermined value f(v) indicative of a higher step number increased in accordance with an increase of the vehicle speed may be inserted between step 232 and 234 at step 248 as shown in FIG. 14. (see a map of FIG. 15) With such a modification as shown in FIGS. 13 and 15, the shock absorbers 10A–10D are maintained at a higher damping state in the occurrence of continual vibration of the vehicle body on a rough road. In the latter case, it is able to effectively restrain vibration of the vehicle body increased in accordance with an increase of the vehicle speed.

Figure 16:
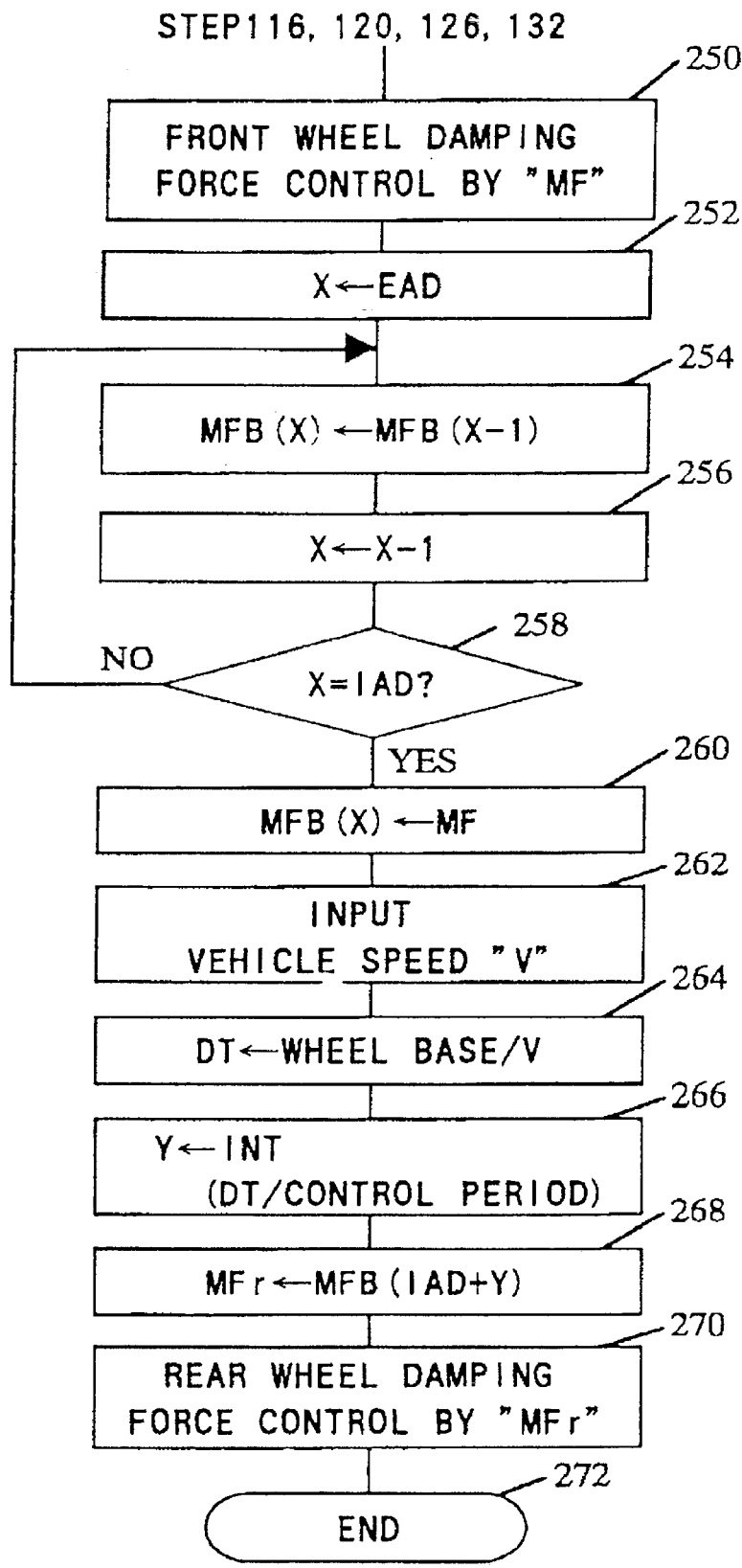
FIG. 16 is a flow chart of a fourth modification of the control program shown in FIG. 2.

Although in the above embodiment the shock absorbers 10A–10D are independently controlled by the computer 23, either one of the vertical acceleration sensors 21a–21d may be adapted to control all the shock absorbers. Alternatively, the vertical acceleration sensors 21a, 21b at the left and right front road wheels may be adapted to control the shock absorbers 10C and 10D with delay of a time. Furthermore, either one of the vertical acceleration sensors 21a, 21b may be adapted to control both the shock absorbers 10A and 10B and to control both the shock absorbers 10C and 10D with delay of a time. In such a modification, a program shown by a flow chart in FIG. 16 is added to the program of FIG. 2, wherein a control signal indicative of the target step number MF determined by processing at step 102–132 of FIG. 2 is applied to the stepping motors 15a, 15 through the driving circuit 24 by processing at step 250 shown in FIG. 16 to set each damping force of the shock absorbers 10A, 10B for the front road wheels to a target damping force defined by the target step number MY.

Figure 17:
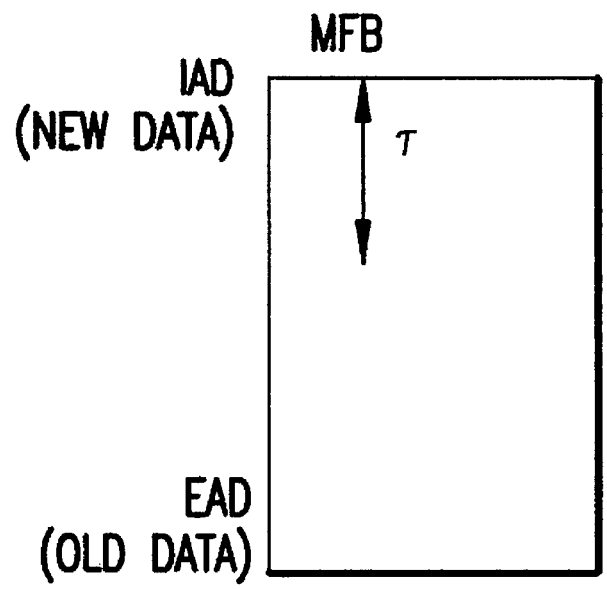
FIG. 17 is a schematic illustration of a target step number buffer memory adapted to delay a data indicative of a target step number.

After processing at step 250, the computer 23 sets at step 252 a final address EAD of a target step number buffer memory MFB as a variable X. As shown in FIG. 17, the buffer memory MFB contained in a random access memory or RAM of computer 23 is adapted to delay the target step number MF. After processing at step 252, the computer 23 successively renews the target step number MF by renewal processing at step 254–260 to memorize a fresh data of the target step number MF in a leading address IAD of the buffer memory MFB and to memorize an old data of the target step number MF in the final address EAD of the buffer memory MFB. In this instance, the old data of the target step number MF is eliminated from the buffer memory MFB, and the fresh data of the target step number MF is memorized in the leading address IAD of the buffer memory MFB.

After processing at step 254–260, the computer 23 is applied at step 262 with an electric signal indicative of the vehicle speed V from a newly provided speed sensor 25 and divides the wheel base length of the vehicle by the vehicle speed V to calculate a time DT during which the rear road wheels arrive at the road surface on which the front road wheels were located. Subsequently, the computer 23 divides the calculated time DT by the execution period of the program and makes the divided time integer to calculate an address retard amount Y which represents the target step number MF for the front road wheels prior to the calculated time DT. After processing at step 266, the computer 23 reads out at step 268 the target step number MF represented by the address retard amount Y from the leading address IAD of buffer memory MFB and sets at step 270 the target step number MF as a target step number MFr for the rear road wheels. Thus, the stepping motors 15c, 15d are applied with a control signal indicative of the target step number MFr through the driving circuit 24 to control each damping force of the shock absorbers 10C, 10D on a basis of the target step number MFr.

Figure 18:
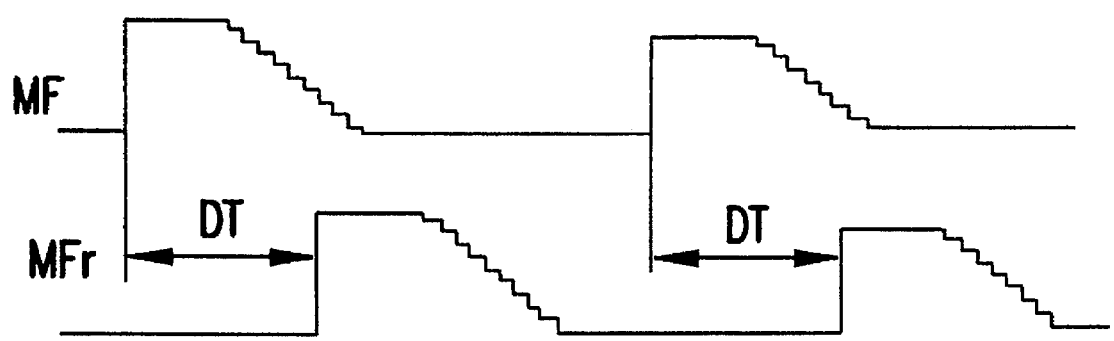
FIG. 18 is a time chart showing a relationship between a target step number for a front road wheel and a target step number for a rear road wheel.

With such processing at step 260–270, each damping force of the shock absorbers 10D, 10D for the rear road wheels is controlled with delay of the time DT after control of the shock absorbers 10A, 10B as shown in FIG. 18. Although in the processing at step 270, the target step number MFr for the rear road wheels has been set as the same value as the target step number MF for the front road wheels, the target step number MF for the front road wheels may be multiplied by an appropriate coefficient to calculate a target step number for the rear road wheels. Although the buffer memory MFB has been adapted to delay the target step number MF for the front road wheels, the buffer memory MFB may be adapted to delay the detected vertical velocity GV itself. In such a case, processing at step 104–134 of FIG. 2 is executed on a basis of the delayed vertical velocity Gv to determine the target step number MFr for the rear road wheels.

Hereinafter, a second embodiment of the present invention will be described. In this second embodiment, the driving circuit 24 is adapted to switch over the shock absorbers 10A, 10B for the front road wheels at the same time and to switch over the shock absorbers 10C, 10D for the rear road wheels at the same time, and the computer 23 is programmed to execute control programs shown in FIGS. 19 to 23.

Figure 19:
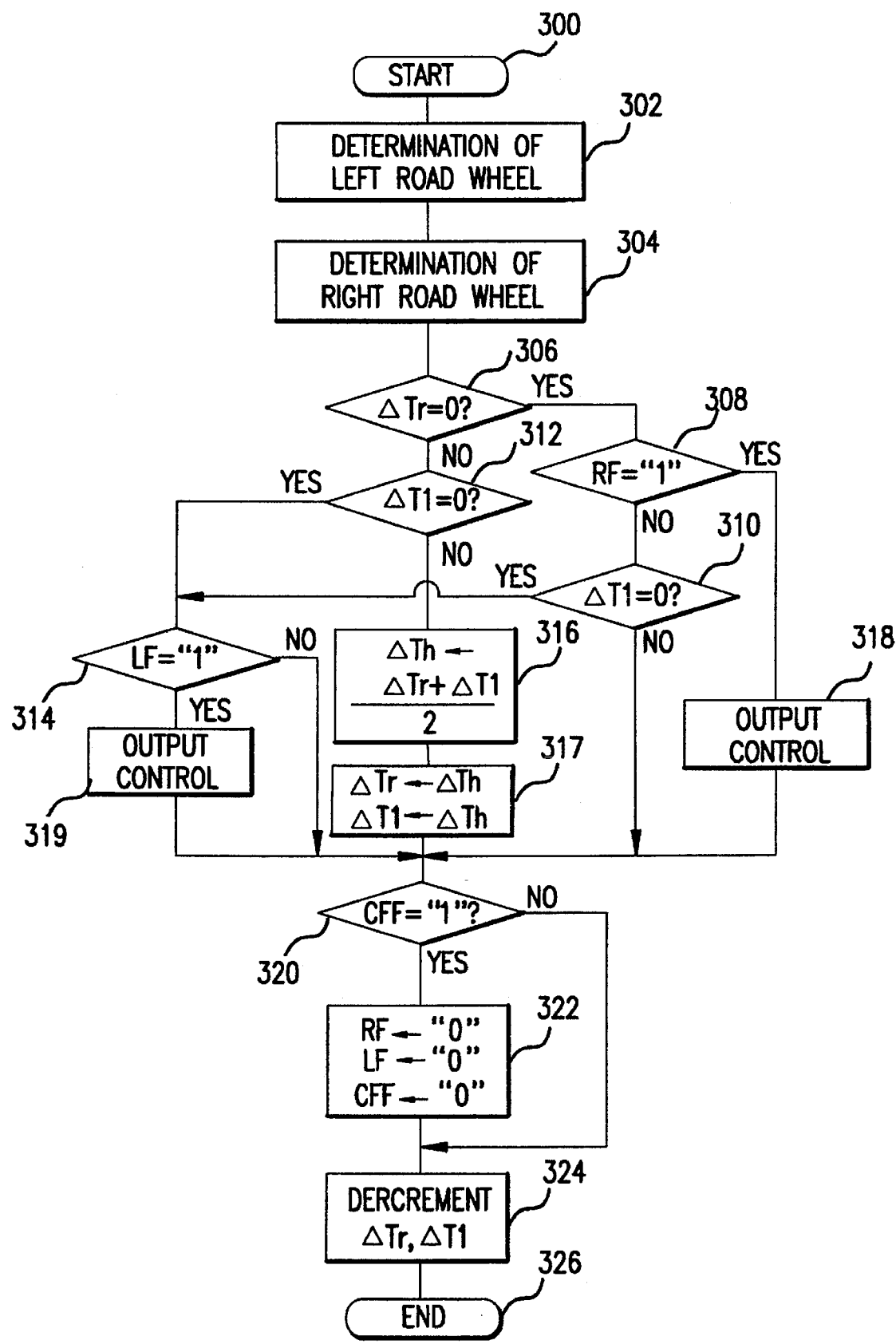
FIG. 19 is a flow chart of a control program adapted to a second embodiment of the present invention.

Assuming that the computer 23 has been connected to the electric power source, the program of FIG. 19 is repeatedly executed by the computer 23 at each lapse of a predetermined time interval after initialized to set various flags and variables as "0" respectively. When started execution of the program at step 300 of FIG. 19, the computer 23 executes determination routines for the left and right road wheels respectively at step 302 and 304. The determination routine for the left road wheels is shown in detail in FIG. 20. When started to execute the determination routine at step 330 in FIG. 20, the computer 23 is applied at step 332 with a data indicative of vertical velocity Gvl at the left front road wheel from the vertical acceleration sensor through the band-pass filter 22a. At the following step 334, the computer 23 determines whether the absolute value of the vertical velocity Gvl is more than a predetermined threshold value Gth of approximately zero. While the absolute value of the vertical velocity Gvl is less than the threshold value Gth, the computer 23 determines a "No" answer at step 334 and finishes at step 346 execution of the determination routine for the left road wheels. The determination routine for the right road wheels is shown in detail in FIG. 21. When stated to execute the determination routine at step 350 in FIG. 21, the computer 23 is applied at step 352 with a data indicative of vertical velocity Gvr at the right front road wheel from the vertical acceleration sensor 21b through the band-pass filter 22a. Until the absolute value of the vertical velocity Gvr exceeds the threshold value Gth, the computer 23 determines a "No" answer at step 354 and finishes at step 366 execution of the determination routine for the right road wheels.

After execution of the determination routines for the left and right road wheels, the computer 23 executes processing at step 306–314 of FIG. 19. Since retard times ΔTl, ΔTr for the left and right road wheels each are set as "0" by the initialization and also changeover flags LF, RF for the left and right road wheels each are set as "0", the computer 23 determines a "Yes" answer at step 306, a "No" answer at step 308, a "Yes" answer at step 310 and a "No" answer at step 314 and causes the program to proceed to step 326 through step 320–324. Thus, the computer 23 finishes execution of the program at step 326 to maintain the shock absorbers 10A, 10B for the front road wheels at the lowest damping state. When each absolute value of the vertical velocities Gvl, Gvr at the front road wheels exceeds the threshold value Gth due to vibration of the vehicle body, the computer 23 determines a "Yes" answer at step 334 of FIG. 20 and causes the determination routine to proceed to step 336. If the changeover flag LF for the left road wheels is "0", the computer 23 determines a "No" answer at step 336 and causes the determination routine to proceed to step 338–344. At step 338, the computer 23 sets the retard time ΔTl as a predetermined value, a changing rate of the vertical velocity Gvl or a predetermined value changed in accordance with a vibration frequency of the vehicle body. At the following step 340, the computer sets a target step number MFl at the left front road wheel in accordance with the absolute value of the vertical velocity Gvl as in the first embodiment. Subsequently, the computer 23 sets at step 342 a driving interval Tml decreased in accordance with an increase of the target step number MFl and sets at step 344 the changeover flag LF for the left front road wheel as "1". Thereafter, the computer 23 finishes at step 346 execution of the determination routine for the left road wheels. On the other hand, the computer 23 executes processing at step 354–364 of FIG. 21 to set the retard time ΔTr as the predetermined value, to set a target step number MFr for the right road wheels in accordance with the vertical velocity Gvr, to set a driving interval Tmr in accordance with the target step number MFr and to set the changeover flag RF for the right road wheels as "1".

Assuming that the absolute value of the vertical velocity Gvr at the right front road wheel has exceeded the threshold value Gth prior to the absolute value of the vertical velocity Gvl at the left front road wheel, the retard time ΔTr is set as a predetermined value other than "0" while the retard time ΔTl is maintained as "0". Thus, the computer 23 determines a "No" answer at step 306 of FIG. 19 and a "Yes" answer at step 312 and causes the program to proceed to step 314. Since in this instance the changeover flag LF for the left road wheel is still maintained as "0", the computer 23 determines a "No" answer at step 314 and causes the program to proceed to step 324 through step 320. At step 324, the computer 23 subtracts "1" from either the retard time ΔTl or ΔTr other than "0" for decrement of the retard time ΔTl or ΔTr. In this instance, only the retard time ΔTr for the right road wheel is decreased.

When the retard time ΔTl for the left road wheel is set as a predetermined value other than "0" during decrement of the retard time ΔTr, the computer 23 determines a "No" answer respectively at step 306 and 312 and causes the program to proceed to step 316 and 317. At step 316 and 317, the computer 23 calculates an average value Th=(ΔTl+ΔTr)/2 of the retard times ΔTl and ΔTr and sets the retard times ΔTl, ΔTr as the calculated average value Th. This means that when the vertical velocities Gvl, Gvr at the left and right road wheels have exceeded a preselected magnitude of approximate zero at different times, both the vertical velocities Gvl, Gvr are deemed to have exceeded the preselected magnitude at an interim point between the different times. Thereafter, the retard times ΔTl, ΔTr are successively decreased by processing at step 324.

When the absolute value of the vertical velocity Gvl at the left front road wheel exceeds the threshold value Gth prior to the absolute value of the vehicle velocity Gvr at the right front road wheel, the retard time ΔTl for the left road wheel is set as a predetermined value other than "0" while the retard time ΔTr for the right road wheels is maintained as "0". Thus, the computer 23 determines a "Yes" answer at step 306 of FIG. 19 and causes the program to proceed to step 308. Since the changeover flag RF for the right road wheel is still maintained as "0", the computer 23 determines a "No" answer respectively at step 308 and 310 and causes the program to proceed to step 324 through step 320. At step 324, the retard time ΔTl for the left road wheel is successively decreased by "1". When the retard time ΔTr is set as a predetermined value other than "0", the computer 23 determines a "No" answer respectively at step 306 and 312 and causes the program to proceed to step 316 and 317 where the computer 23 calculates an average value Th=(ΔTl+ΔTr)/2 of the retard times ΔTl and ΔTr and sets the retard times ΔTl, ΔTr as the calculated average valve Th, respectively. Thereafter, the retard times ΔTl, ΔTr are successively decreased as described above.

Figure 22:
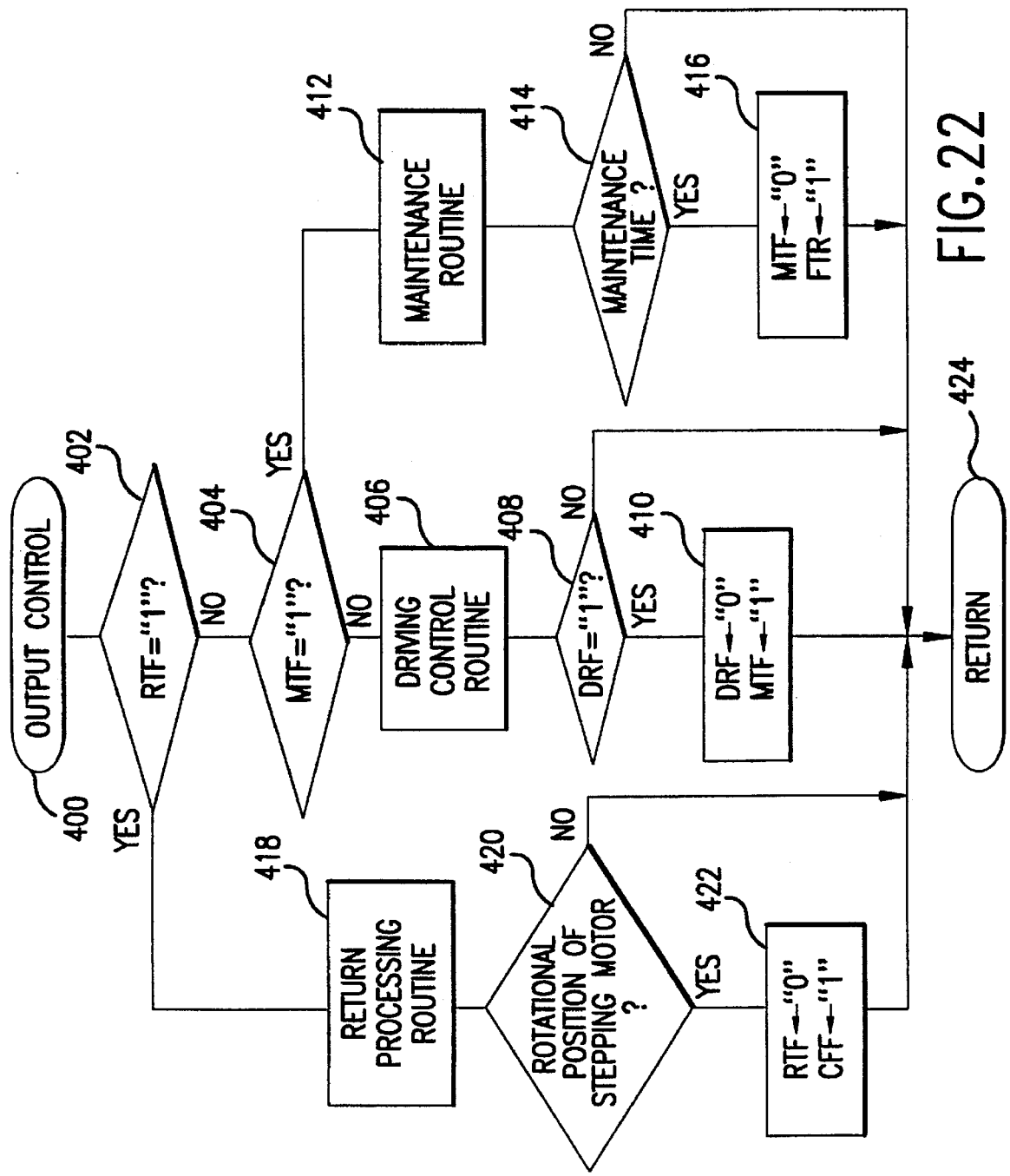
FIG. 22 is a flow chart of an output control routine shown in FIG. 19.

Since the changeover flags LF, RF each are being set as "1" when each of the retard times ΔTl, ΔTr has been decreased "0" by processing at step 324, the computer 23 determines a "Yes" answer respectively at step 306 and 308 and executes at step 318 an output control routine shown in FIG. 22. When started execution of the output control routine at step 400 of FIG. 22, the computer 23 determines at step 402 whether a return flag RTF is "1" or nor and determines at step 404 whether a maintenance flag MTF is "1" or not. The return flag RTF set as "1" represents the fact that each damping force of the shock absorbers 10A, 10B is being returned to "0" from each target damping force defined by target step numbers MFl, MFr. The return flag RTF is set as "0" by initialization of the program. (see FIG. 24(A)) The maintenance flag MTF set as "1" represents the fact that each damping force of the shock absorbers 10A, 10B is maintained at each target damping force defined by the target step numbers MFl, MFr. The return flag RTF is also set as "0" by initialization of the program. (see FIG. 24(A)) Thus, the computer 23 determines a "No" answer at step 404 and causes the program to proceed to step 406 for execution of a driving control routine shown in FIG. 23.

Figure 23:
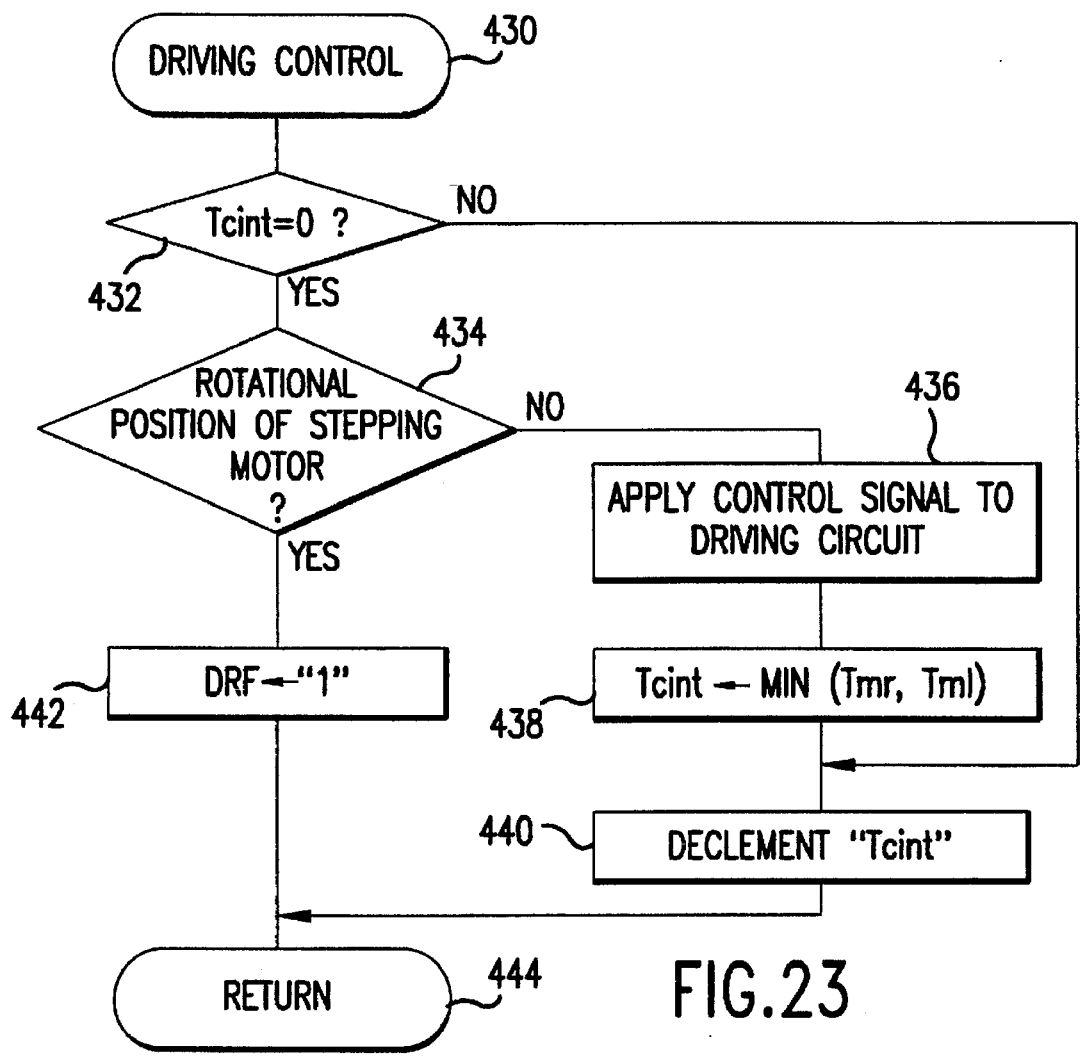
FIG. 23 is a flow chart of a driving control routine shown in FIG. 22.
Figure 24A:
FIG. 24(A) is a time chart showing a switched over condition of a shock absorber.
Figure 24B:
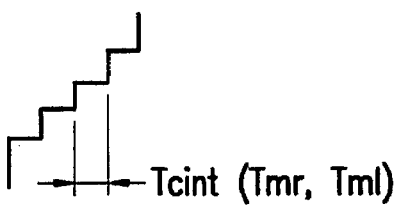
FIG. 24(B) is an enlarged view of a portion indicated by the reference character A in FIG. 24(A)

When started execution of the driving control routine at step 430 of FIG. 23, the computer 23 determines at step 432 whether a driving interval value Tcint is "0" or not. The driving interval value Tcint is adapted to count an interval for drive of the stepping motors 15a, 15b as shown in FIG. 24(B). if the driving interval value Tcint is set as "0", the computer 23 determines a "Yes" answer at step 432 and determines at step 434 whether each present rotational position of the stepping motors 15a, 15b coincides with a target rotational position defined by the smaller or larger target step number MFl or MFr. If the answer at step 434 is "No", the program proceeds to step 436 where the computer 23 applies a control signal to the driving circuit 24. When applied with the control signal, the driving circuit 24 applies a driving signal to the stepping motors 15a, 15b so that the stepping motors 15a, 15b each are rotated by one step toward the target rotational position. At the following step 438, the computer 23 selects a smaller value MIN(Tml, Tmr) of the driving intervals Tml, Tmr and sets the selected small value MIN(Tml, Tmr) as a driving interval value Tcint. After setting the driving interval value Tcint, the computer 23 subtracts "1" from the driving interval value Tcint at step 440 and finishes execution of the driving control program at step 444. Thereafter, the computer 23 determines at step 408 of FIG. 22 whether a finish flag DRF is "1" or not. Since the finish flag DRF is set as "0" by initialization of the program, the computer 23 determines a "No" answer at step 408 and finishes at step 424 execution of the output control routine.

When the execution of the driving control routine of FIG. 23 is resumed by execution of the output control routine at step 318 of FIG. 19, the computer 23 determines a "No" answer at step 432 and causes the program to proceed to step. 440 where the driving interval value Tcint is decreased by "1". When the driving interval value Tcint is decreased "0" by decrement processing at step 440, the computer 23 determines a "Yes" answer at step 432 and causes the program to proceed to step 434. At step 434, the computer 23 determines a "No" answer until each present rotational position of the stepping motors 15a, 15b coincides with the target rotational position defined by smaller one or larger one of the target step numbers MFl, MFr. As a result, the stepping motors 15a, 15b each are successively rotated by one step toward the target rotational position by processing at step 436. When the stepping motors 15a, 15b are rotated to the target rotational position, the computer 23 determines a "Yes" answer at step 434 and sets at step 442 the finish flag DRF as "1". Accordingly, the computer 23 determines a "Yes" answer at step 408 of FIG. 22 after execution of the driving control routine at step 406 and causes the program to proceed to step 410. At step 410, the computer 23 resets the finish flag DRF to "0" and sets the maintenance flag MTF as "1".

When the output control routine is executed by setting of the maintenance flag MTF, the computer 23 determines a "Yes" answer at step 404 of FIG. 22 and causes the program to proceed to step 412 for a maintenance routine. The maintenance routine is programmed to maintain the stepping motors 15a, 15b respectively at their present rotational positions for a predetermined maintenance time. Thus, until the maintenance time elapses after the stepping motors 15a, 15b has been rotated to the target rotational position, the computer 23 determines a "No" answer at step 414 and finishes the execution of the output control routine at step 424. Upon lapse of the maintenance time, the computer 23 determines a "Yes" answer at step 414 and causes the program to proceed to step 416 where the computer 23 resets the maintenance flag MTF to "0" and sets the return flag RTF as "1".

When the execution of the output control routine is resumed by setting the return flag RTF, the computer 23 determines a "Yes" answer at step 402 of FIG. 22 and causes the program to proceed to step 418 for a return processing routine. The return processing routine is programmed to gradually return the stepping motors 15a, 15b from their present rotational positions to a standard rotational position where the shock absorbers 10A, 10B each are maintained at the lowest damping state. Thus, until the stepping motors 15a, 15b are returned to the standard rotational position, the computer 23 determines a "No" answer at step 420 and finishes the execution of the output control routine at step 424. When the stepping motors 15a, 15b are returned to the standard rotational position, the computer 23 determines a "Yes" answer at step 420 and causes the program to step 422. At step 422, the computer 23 resets the return flag RTF to "0" and sets an end flag CFF as "1". Thereafter, the computer 23 finishes the execution of the output control routine at step 424. When the end flag CFF is set as "1", the computer 23 determines a "Yes" answer at step 320 of FIG. 19 and causes the program to proceed to step 322. At step 322, the computer 23 resets the changeover flags LF, RF and the end flag CFF to "0", respectively. As a result, the shock absorbers 10A, 10B are returned to their initial conditions.

As a result of the foregoing control, each damping force of the shock absorbers 10A, 10B is rapidly increased up to the target damping force defined by the smaller or larger target step number MFl or MFr and maintained at the target damping force for the predetermined maintenance time. Upon lapse of the maintenance time, each damping force of the shock absorbers 10A, 10B is gradually decreased to its initial condition. In this instance, the rapid increase of the damping force is caused by processing at step 316 and 317 of FIG. 19 upon lapse of the predetermined time at an interim point between times at which each absolute value of the vertical velocities Gvl, Gvr at the left and right road wheels has exceeded the threshold value Gth. This means that each damping force of the shock absorbers 10A, 10B is switched over in a condition where the relative velocity between the vehicle body and the left and right road wheels is approximately zero. This is useful to provide a damping force control system capable of reducing undesirable shocks and noises caused by switchover of the damping force in a simple construction and of precisely controlling the damping force at the vibratory region and attenuation region described above.

Figure 21:
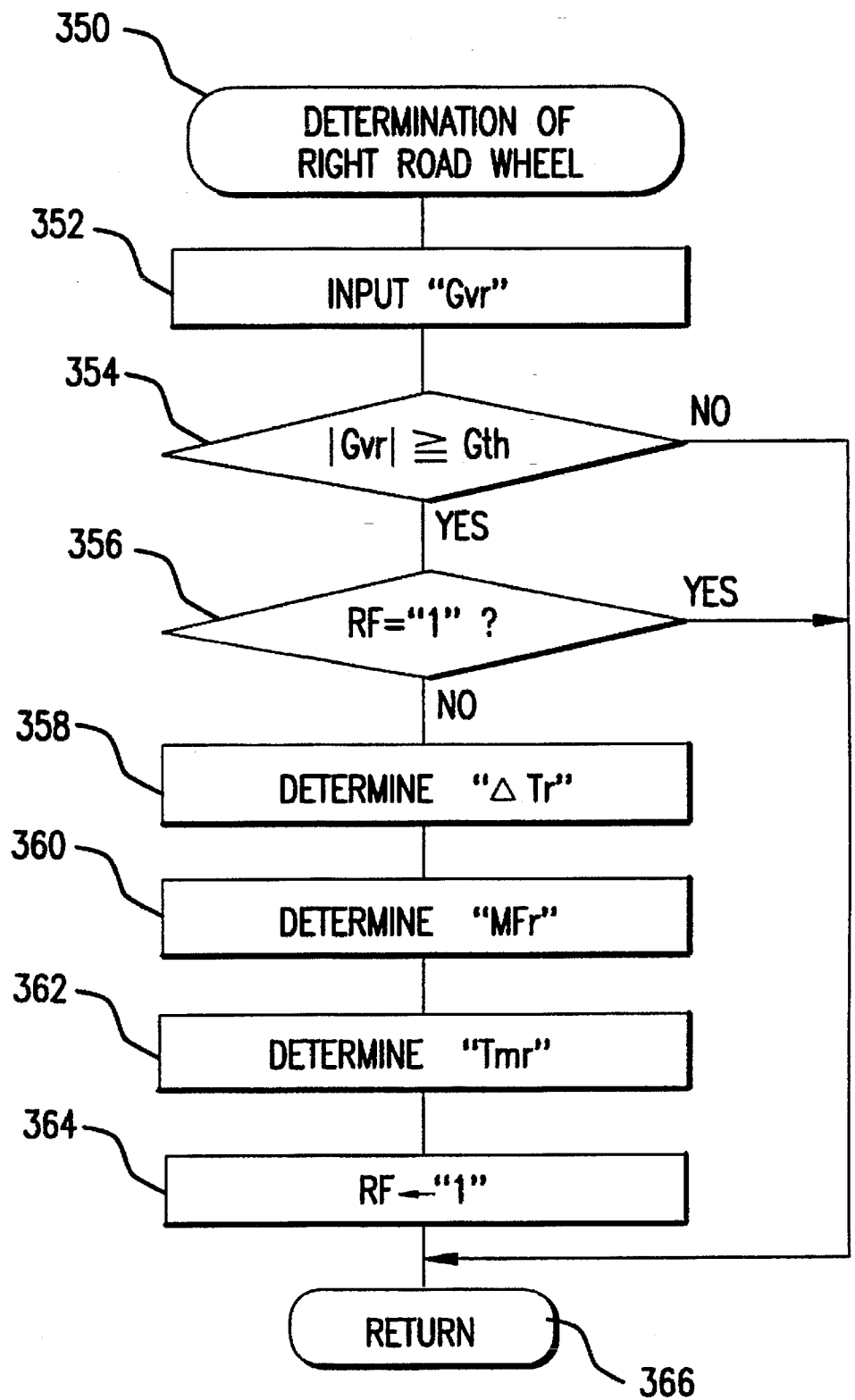
FIG. 21 is a flow chart of a rear wheel determination routine shown in FIG. 19.

Assuming that only the absolute value of the vertical velocity Gvr at the right road wheel has exceeded the threshold Gth, the computer 23 executes a right wheel detection routine of FIG. 21 during which the retard time ΔTr for the right road wheel is set as a predetermined value, the target step number MFr for the right road wheel is set in accordance with vertical velocity Gvr, the driving interval Tmr for the right road wheel is set in accordance with the target step number MFr and the changeover flag RF for the right road wheel is set as "1". On the other hand, the retard time ΔTl for the left road wheel is maintained as "0" and the changeover flag LF is maintained as "0". In this instance, until the retard time ΔTr is decreased to "0", the computer 23 determines a "No" answer at step 306, a "Yes" answer at step 312 and a "No" answer at step 314 and causes the program to proceed to step 320. When the retard time ΔTr is decreased to "0" by processing at step 324, the computer 23 determines a "Yes" answer respectively at step 306 and 308 and causes the program to proceed to step 318. Thus, the output control routine is executed by the computer 23 at step 318 to switch over each damping force of the shock absorbers 10A, 10B to a target damping force defined by the target step number MFr. As a result, each damping force of the shock absorbers is maintained at the target damping state for the predetermined maintenance time and is gradually decreased to the initial condition upon lapse of the maintenance time. In this instance, as shown in FIG. 23, the driving interval value Tcint is set as the interval Tmr for the right road wheel by processing at step 438 of the driving control routine, and the target rotational position is defined by the target step number MFr for the right road wheel by processing at step 434.

Figure 20:
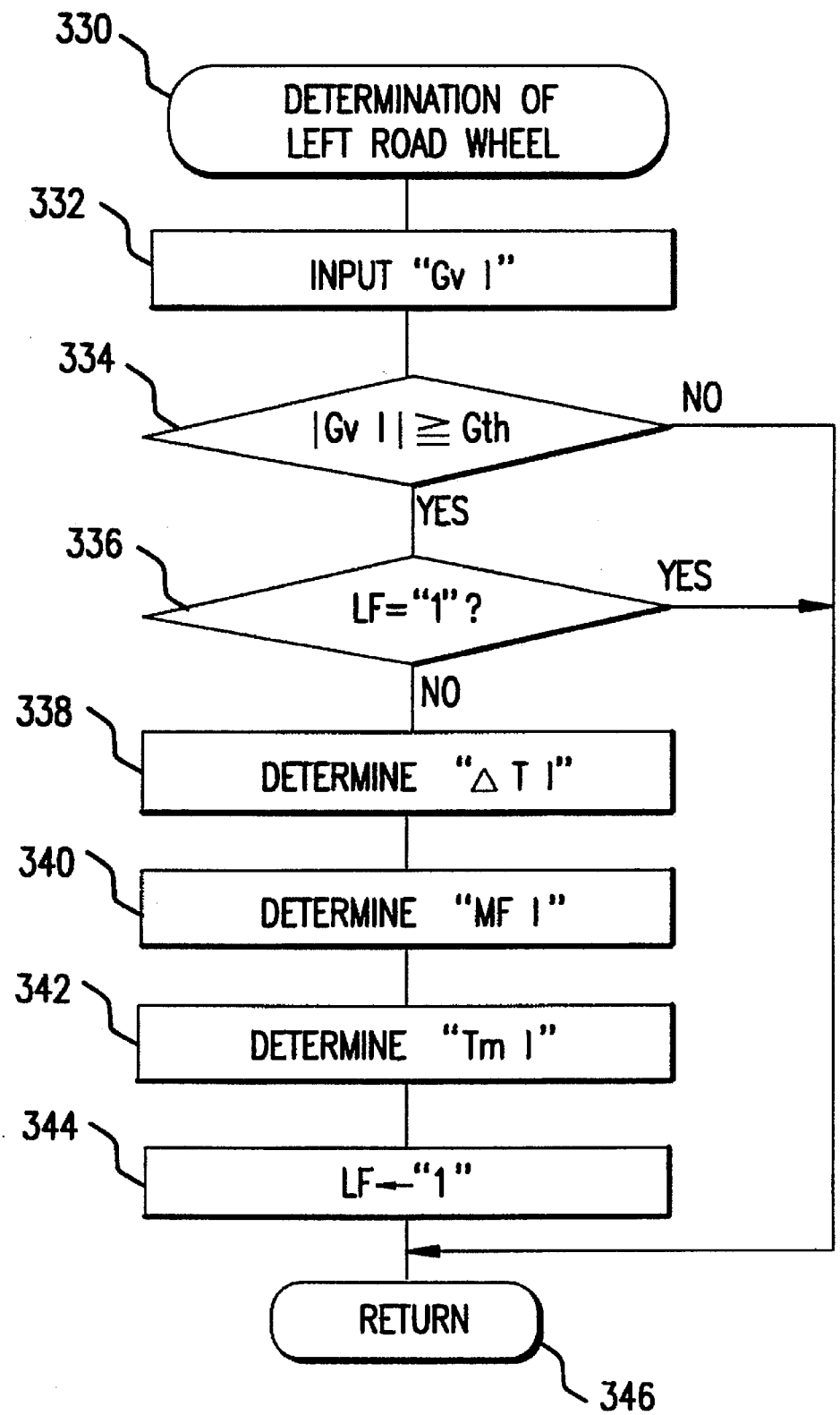
FIG. 20 is a flow chart of a front wheel determination routine shown FIG. 19.

Assuming that only the absolute value of the vertical velocity Gvl at the left road wheel has exceeded the threshold Gth, the computer 23 executes a left wheel detection routine of FIG. 20 during which the retard time ΔTl for the left road wheel is set as a predetermined value, the target step number MFl for the left road wheel is set in accordance with the vertical velocity Gvl, the driving interval Tml for the left road wheel is set in accordance with the target step number MFl and the changeover flag LF for the left road wheel is set as "1". On the other hand, the retard time ΔTr for the right road wheel is maintained as "0" and the changeover flag RF is maintained as "0". In this instance, until the retard time ΔTl is decreased to "0", the computer 23 determines a "Yes" answer at step 306, a "No" answer at step 308 and a "No" answer at step 310 and causes the program to proceed to step 320. When the retard time ΔTl is decreased to "0" by processing at step 324, the computer 23 determines a "Yes" answer respectively at step 310 and 314 and causes the program to proceed to step 319. Thus, the output control routine is executed by the computer 23 at step 319 to switch over each damping force of the shock absorbers 10A, 10B to a target damping force defined by the target step number MFl. As a result, each damping force of the shock absorbers is maintained at the target damping state for the predetermined maintenance time and is gradually decreased to the initial condition upon lapse of the maintenance time. In this instance, as shown in FIG. 23, the driving interval value Tcint is set as the interval Tml for the left road wheel by processing at step 438 of the driving control routine, and the target rotational position is defined by the target step number MFl for the left road wheel by processing at step 434.

As described above, the damping force against vertical vibration of the vehicle body at the front road wheels is controlled, and also the damping force against vertical vibration of the vehicle body at the rear road wheels is controlled in the same manner as in the foregoing operation. Furthermore, as described in the modification of the first embodiment, the damping force against vertical vibration of the vehicle body at the rear road wheels may be controlled by delaying the damping force control at the front road wheels.

As in the second embodiment, the vertical velocities Gvl, Gvr each are compared with the threshold Gth by processing at step 334 of FIG. 20 and 354 of FIG. 21, the shock absorbers 10A–10D are maintained at their lowest damping state when the vertical velocities Gvl, Gvr are approximately zero. This is useful to avoid that the shock absorbers are frequently switched over.

Figure 25:
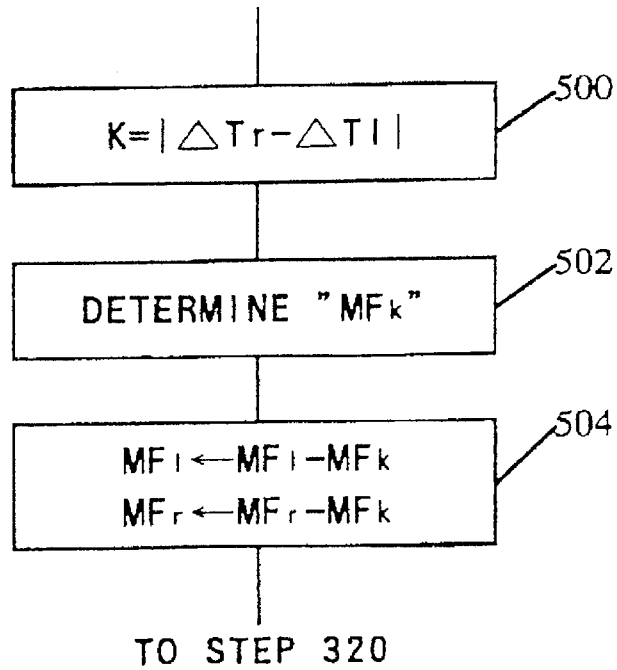
FIG. 25 is a flow chart of a modification of the program shown in FIG. 19.
Figure 26:
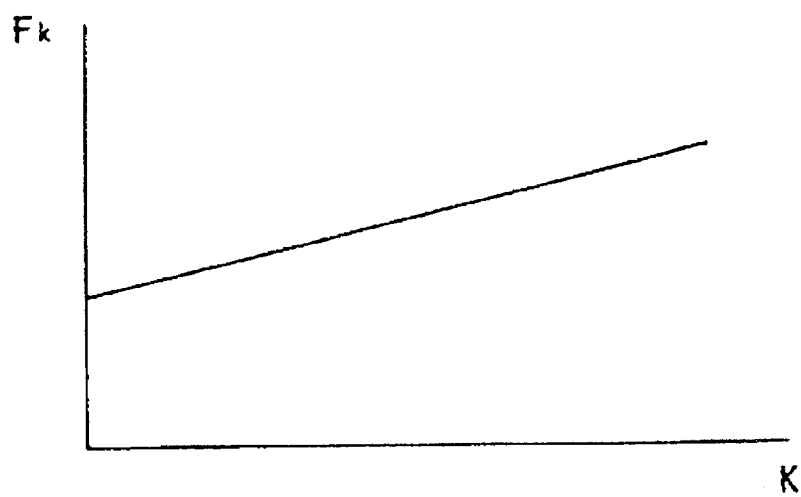
FIG. 26 is a graph showing a damping force correction value in relation to a deviation of retard times.

In FIG. 25 there is illustrated a modification of the second embodiment wherein processing at step 316 and 317 shown in FIG. 19 is replaced with processing at step 500–504. In this modification, the computer 23 executes the processing at step 500–504 as described below when determined a "No" answer respectively at step 306 and 312 shown in FIG. 19. At step 500, the computer 23 calculates a deviation of the retard times ΔTr and ΔTl. At step 502, the computer 23 determines a correction value MFk corresponding with the calculated deviation k with reference to a correction table shown in FIG. 26. Thus, the computer 23 subtracts at step 504 the correction value MFk respectively from the target step numbers Mrl, MFr for the left and right road wheels and sets each resultant of the subtraction as the target step numbers Mrl, MFr.

Since in the above modification the retard times ΔTl, ΔTr for the left and right road wheels is decreased to "0" at a different time by decrement processing at step 324. When the retard time ΔTl for the left road wheel becomes "0" prior to the retard time ΔTr for the right road wheel, the computer 23 determines a "No" answer at step 306, a "Yes" answer at step 312 and a "Yes" answer at step 314 and causes the program to proceed to step 319 for execution of the output control routine. If the retard time ΔTr for the right road wheel becomes "0" prior to the retard time ΔTl for the left road wheel, the computer 23 determines a "Yes" answer respectively at step 306 and 308 and causes the program to proceed to step 318 for execution of the output control routine. Thus, the stepping motors 15a, 15b are simultaneously controlled by execution of the output control routine. As a result, each damping force of the shock absorbers 10A, 10B is switched over to a target damping force defined by either one of the corrected target step numbers MFl and MFr and returned to the initial condition after lapse of the predetermined maintenance time. In this instance, each damping force of the shock absorbers 10A, 10B is controlled to a target damping force defined by either smaller one or larger one of the corrected target step numbers MFl and MFr.

As is understood from the above description, the damping forces of the shock absorbers 10A, 10B are switched over against vertical vibration of the vehicle body after lapse of the predetermined time when the vertical velocities Gvl, Gvr exceeded the threshold value Gth of approximate zero. In this instance, the target step numbers MFl, MFr each are reduced in accordance with an increase of a difference between times respectively at which the vertical velocities Gvl and Gvr exceeded the threshold value Gth. As a result, each damping force of the shock absorbers 10A, 10B is switched over to a target damping state defined by either smaller one or larger one of the reduced target step numbers. Accordingly, even if the relative velocity between the vehicle body and the left and right road wheels is other than "0", it is able to reduce undesirable shocks and noises caused by switchover of the damping forces.

Figure 27:
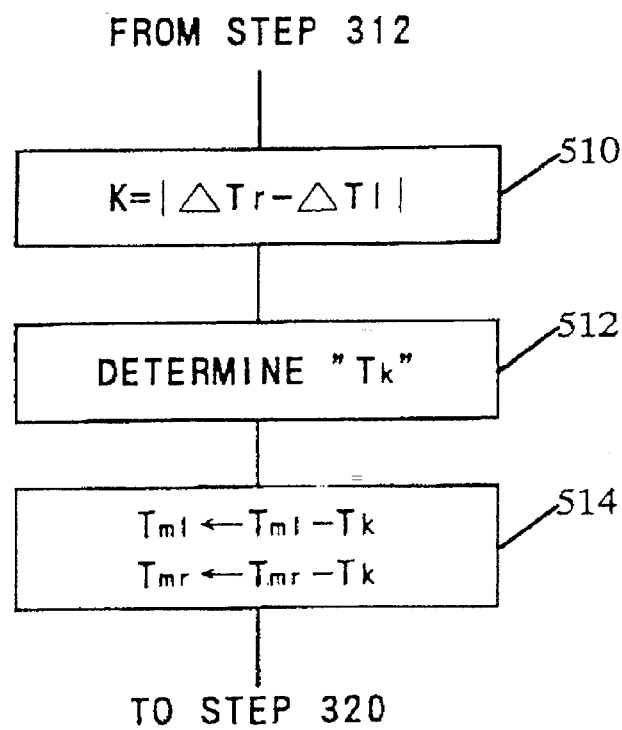
FIG. 27 is a flow chart of another modification of the program shown in FIG. 19.
Figure 28:
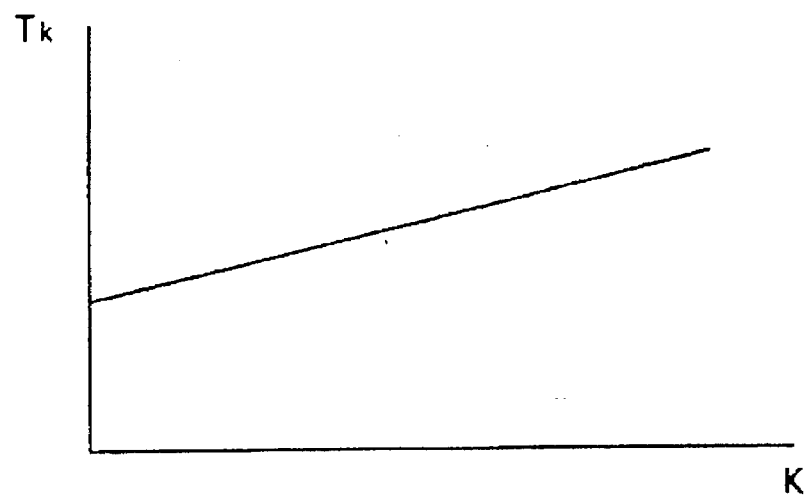
FIG. 28 is a graph showing an interval correction value in relation to a deviation between retard times.

In FIG. 27 there is illustrated another modification of the second embodiment wherein processing at step 316 and 317 of FIG. 19 is substituted for processing at step 510–514 of FIG. 27. In this modification, the computer 23 determines a "No" answer respectively at step 306 and 312 of FIG. 19 when both the absolute values of vertical velocities Gvl, Gvr exceeded the threshold value Gth and causes the program to proceed to step 510–514. Thus, the computer 23 calculates at step 510 a deviation K of the retard times ΔTr and ΔTl and determines at step 512 an interval correction value Tk in accordance with the calculated deviation K with reference to a correction table shown in FIG. 28. At the following step 514, the computer 23 adds the interval correction value Tk to the driving intervals Tml, Tmr and changes the driving intervals Tml, Tmr to each resultant of the addition.

In this modification, the retard times ΔTl, ΔTr are reduced to "0" at a different time by decrement processing at step 324. When the retard time ΔTl becomes "0" prior to the retard time ΔTr, the computer 23 executes the output control routine at step 319. If the retard time ΔTr becomes "0" prior to the retard time ΔTl, the computer 23 executes the output control routine at step 318. Thus, the shock absorbers 10A, 10B are simultaneously switched over to a target damping state defined by either smaller one or larger one of the target step numbers MFl and MFr and returned to their initial conditions after lapse of the predetermined maintenance time. In this instance, the driving intervals Tml, Tmr are corrected by the interval correction value Tk which is increased in accordance with an increase of the deviation K between the retard times ΔTl and ΔTr. As a result, the driving intervals Tml, Tmr are increased in accordance with an increase of the deviation K. This results in an increase of the driving interval value Tcint determined by processing at step 438 of the driving control routine shown in FIG. 23. Accordingly, each driving interval of the stepping motors 15a, 15b determined by processing at step 432 and 440 becomes larger in accordance with an increase of the deviation K to reduce each switchover speed of the shock absorbers 10A, 10B.

As a result of the foregoing control, each switchover speed of the shock absorbers 10A, 10B is decreased in accordance with an increase of a difference between times respectively at which the vertical velocities exceeded the threshold value Gth of approximate zero. Thus, even if the relative velocity between the vehicle body and the left and right road wheels is other than "0", it is able to reduce undesirable shocks and noises caused by switchover of the shock absorbers.

Although in the foregoing modifications, the shock absorbers have been switched over when either one of the retard times ΔTl and ΔTr became "0", the shock absorbers may be switched over when both the retard times ΔTl and ΔTr have become "0". In such a case, the computer 23 is programmed to execute the output control routine at step 318 or 319 when both the retard times ΔTl and ΔTr have become "0".

Although in the foregoing embodiments and modifications, vibration of the vehicle body has been determined in dependence upon a magnitude of vertical velocity of the vehicle body, the vibration of the vehicle body may be determined in dependence upon a magnitude of vertical acceleration of the vehicle body. In such a case, the computer 23 is programmed to be applied with an electric signal indicative of vertical acceleration from the vertical acceleration sensors 21a–21d for determination of the magnitude of the vibration of the vehicle body. Alternatively, the vertical acceleration sensors 21a–21d each may be replaced with a vehicle height sensor arranged to detect height of the vehicle body from the road surface or a load sensor arranged to detect a load applied to the shock absorbers. Furthermore, the stepping motors 15a–15d in the control system may be replaced with electric motors of the other type.

What is claimed is:

1. A damping force control system for an automotive vehicle having a semiactive damper mechanism provided between an unsprung mass and a sprung mass of the vehicle to dampen vertical vibration of the sprung mass, said control system including control means for switching over the semiactive damper mechanism from a low damping state to a high damping state in response to an increase of vertical vibration of the sprung mass, wherein the control system comprises:

detection means for detecting vertical velocity of the sprung mass and for producing an input signal indicative of an absolute value of the detected vertical velocity;

determination means responsive to the input signal from the detection means for determining whether or not the absolute value of the detected vertical velocity has exceeded a preselected magnitude of approximate zero; and means for permitting switchover of said damper mechanism from the low damping state to the high damping state upon lapse of a predetermined time after it has been determined by the determination means that the absolute value of the detected vertical velocity exceeded the preselected magnitude.

2. A damping force control system as recited in claim 1, further comprising second detection means for detecting a changing rate of the detected vertical velocity and correction means for shortening the predetermined time in accordance with an increase of the changing rate of the detected vertical velocity.

3. A damping force control system as recited in claim 1, further comprising extraction means for extracting a frequency component included in vertical vibration of the sprung mass and correction means for shortening the predetermined time in accordance with an increase of the extracted frequency component.

4. A damping force control system for an automotive vehicle having a semiactive damper mechanism provided between an unsprung mass and a sprung mass of the vehicle to dampen vertical vibration of the sprung mass, wherein the control system comprises:

detection means for detecting vertical velocity of the sprung mass of the vehicle and for producing an input signal indicative of an absolute value of the detected vertical velocity;

first determination means responsive to the input signal from the detection means for determining whether or not the absolute value of the detected vertical velocity has exceeded a preselected magnitude of approximate zero;

second determination means responsive to the input signal from the detection means for determining whether or not the absolute value of the detected vertical velocity has decreased approximately zero after it was determined by the first determination means;

first control means for switching over the semiactive damper mechanism from a low damping state to a high damping state upon lapse of a predetermined time after it has been determined by the first determination means that the detected vertical velocity exceeded the preselected magnitude; and second control means for switching over the semiactive damper mechanism from the high damping state to the low damping state at a time when it has been determined by the second determination means that the absolute value of the detected vertical velocity decreased approximately zero.

5. A damping force control system as recited in claim 4, further comprising peak value detection means for successively detecting a peak value of the vertical velocity detected by said detection means and renewing the detected peak value and third control means for prohibiting switchover of the semiactive damper mechanism and maintaining the semiactive damper mechanism in the high damping state for a predetermined time when the detected vertical velocity has increased more than a previous peak value renewed by said peak value detection means.

6. A damping force control system for an automotive vehicle having a set of semiactive damper mechanisms respectively provided between the vehicle body and a set of left and right road wheels to dampen vertical vibration of the vehicle body at the left and right road wheels, said control system including control means for switching over both the semiactive damper mechanisms from a low damping state to a high damping state in response to an increase of vertical vibration of the vehicle body at either one of the road wheels, wherein the control system comprises:

detection means for detecting vertical velocity of the vehicle body respectively at the left and right road wheels and for producing an input signal indicative of each absolute value of the detected vertical velocities;

determination means responsive to the input signal from the detection means for determining whether or not either one of absolute values of the detected vertical velocities has exceeded a preselected magnitude of approximate zero; and means for permitting switchover of both the semiactive damper mechanisms from the low damping state to the high damping state upon lapse of a predetermined time after it has been determined by the determination means that either one of the absolute values of the detected vertical velocities exceeded the preselected magnitude.

7. A damping force control system for an automotive vehicle having a set of semiactive damper mechanisms respectively provided between the vehicle body and a set of left and right road wheels to dampen vertical vibration of the vehicle body at the left and right road wheels, said control system including control means for switching over both the semiactive damper mechanisms from a low damping state to a high damping state in response to an increase of vertical vibration of the vehicle body at either one of the road wheels, wherein the control system comprises:

detection means for detecting vertical velocity of the vehicle body respectively at the left and right road wheels and for producing an input signal indicative of each absolute value of the detected vertical velocities;

determination means responsive to the input signal from the detection means for determining whether or not either one of absolute values of the detected vertical velocities has exceeded a preselected magnitude of approximate zero;

means for permitting switchover of both the semiactive damper mechanisms from the low damping state to the high damping state upon lapse of a predetermined time when it has been determined by the determination means that either one of the absolute values of the detected vertical velocities exceeded the preselected magnitude; and means for switching over both the semiactive damper mechanisms from the high damping state to the low damping state in accordance with an increase of a difference between times respectively at which it has been determined by the determination means that each absolute value of the detected vertical velocities exceeded the preselected magnitude.

8. A damping force control system for an automotive vehicle having a set of semiactive damper mechanisms respectively provided between the vehicle body and a set of left and right road wheels to dampen vertical vibration of the vehicle body at the left and right road wheels, said control system including control means for switching over both the semiactive damper mechanisms from a low damping state to a high damping state in response to an increase of vertical vibration of the vehicle body at either one of the road wheels, wherein the control system comprises:

detection means for detecting vertical velocity of the vehicle body respectively at the left and right road wheels and for producing an input signal indicative of each absolute value of the detected vertical velocities;

determination means for determining whether or not either one of absolute values of the detected vertical velocities has exceeded a preselected magnitude of approximate zero;

means for permitting switchover of both the semiactive damper mechanisms from the low damping state to the high damping state upon lapse of a predetermined time when it has been determined by the determination means that either one of the absolute values of the detected vertical velocities exceeded the preselected magnitude; and means for decreasing each changing rate of damping forces of the semiactive damper mechanisms in accordance with an increase of a difference between times respectively at which it has been determined by the determination means that each absolute value of the detected vertical velocities exceeded the preselected magnitude.

* * * * *

UNITED STATES PATENT AND TRADEMARK OFFICE
CERTIFICATE OF CORRECTION

PATENT NO. : 5,642,899            Page 1 of 5
DATED : July 1, 1997
INVENTOR(S) : Hideo Inoue, e.t al.

It is certified that error appears in the above-identified patent and that said Letters Patent is hereby corrected as shown below:

Title page, item [57],

IN THE ABSRACT, line 10: Change "mate" to --mately--.

| Column | Line | |
|---|---|---|
| 1 | 60 | Change "mate" to --mately--. |
| 1 | 67 | Change "provide" to --provided--. |
| 2 | 8 | Change "approximate" to --approximately--. |
| 3 | 60 | Change "FIG 2" to --FIG. 2--. |
| 6 | 30 | Change "set" to --sets-- |
| 7 | 30 | Change "108" to --106--. |
| 7 | 65 | Change "be also" to --also be--. |

UNITED STATES PATENT AND TRADEMARK OFFICE
CERTIFICATE OF CORRECTION

PATENT NO. : 5,642,899
DATED : July 1, 1997
INVENTOR(S) : Hideo Inoue, et. al.

It is certified that error appears in the above-identified patent and that said Letters Patent is hereby corrected as shown below:

| Column | Line | |
|---|---|---|
| 8 | 36 | Change "F2," to --F2.--. |
| 9 | 15 | Change "reached" to --reaching--. |
| 9 | 25 | Change "Gr" to --Gv--. |
| 9 | 45 | Change "in crease" to --increase--. |
| 10 | 19 | After "either" insert --of the--. |
| 10 | 27 | Change "Gr" to --Gv--; after "either" insert --of the--. |
| 10 | 32 | Change "$m_1(1=1-11)$" to --$m_i(i-1-11)$--. |
| 11 | 42 | Change "determined" to --determining--. |
| 11 | 51 | Change "Gr" to --Gv--. |
| 12 | 7 | After "body)" insert --.--. |

UNITED STATES PATENT AND TRADEMARK OFFICE
CERTIFICATE OF CORRECTION

PATENT NO. : 5,642,899  
DATED : July 1, 1997  
INVENTOR(S) : Hideo Inoue, et. al.

It is certified that error appears in the above-identified patent and that said Letters Patent is hereby corrected as shown below:

| Column | Line | |
|---|---|---|
| 13 | 42 | Change "delay of a time" to --a delay of time--. |
| 13 | 50 | Change "MY" to --MF--. |
| 14 | 57 | After "sensor" insert --21a--. |
| 14 | 66 | Change "stated" to --starting--. |
| 15 | 26 | Change "LP" to LF--. |
| 15 | 33 | After "computer" insert --23--. |
| 16 | 8 | Change "approximate" to --approximately--. |
| 16 | 40 | Change "started" to --starting--. |
| 16 | 42 | Change "nor" to --not--. |
| 16 | 57 | Change "started" to --starting--. |
| 16 | 62 | Change "if" to --If--. |

UNITED STATES PATENT AND TRADEMARK OFFICE
CERTIFICATE OF CORRECTION

PATENT NO. : 5,642,899
DATED : July 1, 1997
INVENTOR(S) : Hideo Inoue, et. al.

It is certified that error appears in the above-identified patent and that said Letters Patent is hereby corrected as shown below:

| Column | Line | |
|---|---|---|
| 17 | 22 | Change "step. 440" to --step 440--. |
| 17 | 50 | Change "has" to --have--. |
| 18 | 5 | Before "step 422" insert --proceed to--. |
| 19 | 62 | Change "Mr1" to --MF1--. |
| 19 | 64 | Change "Mr1" to --MF1--. |
| 20 | 19 | After "either" insert --a--; after "or" insert --a--. |
| 20 | 29 | Change "exceeded" to --exceed--. |
| 20 | 31 | After "either" insert --a--. |
| 20 | 30 | After "or" insert --a--. |
| 20 | 43 | Change "exceeded" to --exceed--. |
| 20 | 44 | Change "step" to --steps--. |

UNITED STATES PATENT AND TRADEMARK OFFICE
CERTIFICATE OF CORRECTION

PATENT NO. : 5,642,899
DATED : July 1, 1997
INVENTOR(S) : Hideo Inoue, et. al.

It is certified that error appears in the above-identified patent and that said Letters Patent is hereby corrected as shown below:

| Column | Line | |
|---|---|---|
| 20 | 60 | Before smaller insert --a--; before "larger" insert --a--. |
| 21 | 13 | Change "approximate" to --approximately--. |
| 21 | 60 | Change "approximate" to --approximately--. |
| 22 | 25 | Change "approximate" to --approximately--. |
| 23 | 5 | Change "approximate" to --approximately--. |
| 24 | 25 | Change "approximate" to --approximately--. |

Signed and Sealed this

Tenth Day of March, 1998

Attest:

BRUCE LEHMAN

*Attesting Officer*  *Commissioner of Patents and Trademarks*